US009886883B2

(12) United States Patent
Ahn et al.

(10) Patent No.: US 9,886,883 B2
(45) Date of Patent: Feb. 6, 2018

(54) DISPLAY APPARATUS AND A METHOD OF OPERATING THE SAME

(71) Applicant: SAMSUNG DISPLAY CO., LTD., Yongin-si, Gyeonggi-do (KR)

(72) Inventors: Ik-Hyun Ahn, Hwaseong-si (KR); Yoon-Gu Kim, Seoul (KR); Bong-Im Park, Hwaseong-Si (KR); Hyun-Sik Hwang, Hwaseong-Si (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 9 days.

(21) Appl. No.: 15/053,265

(22) Filed: Feb. 25, 2016

(65) Prior Publication Data

US 2016/0379541 A1 Dec. 29, 2016

(30) Foreign Application Priority Data

Jun. 26, 2015 (KR) ........................ 10-2015-0091283

(51) Int. Cl.
*G09G 3/20* (2006.01)
*G09G 3/36* (2006.01)
*G09G 5/00* (2006.01)
*H04N 1/60* (2006.01)
*G06T 11/00* (2006.01)

(52) U.S. Cl.
CPC ............ *G09G 3/2003* (2013.01); *G09G 3/36* (2013.01); *G09G 2300/0447* (2013.01); *G09G 2310/08* (2013.01); *G09G 2320/0673* (2013.01); *G09G 2360/16* (2013.01)

(58) Field of Classification Search
CPC combination set(s) only.
See application file for complete search history.

(56) References Cited

U.S. PATENT DOCUMENTS 7,221,381 B2 * 5/2007 Brown .................... G09G 3/20 345/12
2003/0035673 A1 * 2/2003 Yamakawa ........ H04N 1/40062 400/76

(Continued)

FOREIGN PATENT DOCUMENTS

| | | |
|---|---|---|
| JP | 2006-065231 | 3/2006 |
| KR | 1020120006926 | 1/2012 |
| KR | 1020140061028 | 5/2014 |

*Primary Examiner* — Wesner Sajous
(74) *Attorney, Agent, or Firm* — F. Chau & Associates, LLC

(57) ABSTRACT

A display apparatus includes a timing controller and a display panel. The timing controller generates first and second image data based on input image data and generates output image data based on the first and second image data. The first image data corresponds to a boundary region in a first image. The second image data corresponds to a non-boundary region in the first image. The display panel includes a plurality of pixels and displays the first image based on the output image data. The plurality of pixels include boundary pixels corresponding to the boundary region and non-boundary pixels corresponding to the non-boundary region. The boundary pixels operate based on a reference gamma curve. The non-boundary pixels operate based on first and second gamma curves different from the reference gamma curve.

33 Claims, 22 Drawing Sheets

(56) References Cited

U.S. PATENT DOCUMENTS

| | | | | |
|---|---|---|---|---|
| 2003/0085906 | A1* | 5/2003 | Elliott | G09G 3/20<br>345/613 |
| 2008/0088649 | A1* | 4/2008 | Ikeno | G09G 3/3611<br>345/690 |
| 2009/0309903 | A1* | 12/2009 | Park | G09G 3/3611<br>345/690 |
| 2010/0309194 | A1* | 12/2010 | Shin | G09G 3/3426<br>345/214 |
| 2013/0194494 | A1* | 8/2013 | Chun | G09G 3/2059<br>348/453 |
| 2013/0321483 | A1* | 12/2013 | You | G09G 5/10<br>345/690 |
| 2014/0232711 | A1* | 8/2014 | Park | G06T 5/003<br>345/212 |
| 2015/0022512 | A1 | 1/2015 | Ahn et al. | |
| 2015/0339967 | A1* | 11/2015 | Shin | G06F 3/1446<br>345/690 |

* cited by examiner

DISPLAY APPARATUS AND A METHOD OF OPERATING THE SAME

CROSS-REFERENCE TO RELATED APPLICATION

This application claims priority under 35 U.S.C. §119 to Korean Patent Application No. 10-2015-0091283, filed on Jun. 26, 2015 in the Korean Intellectual Property Office (KIPO), the disclosure of which is incorporated by reference herein in its entirety.

TECHNICAL FIELD

Exemplary embodiments of the present inventive concept relate to display systems, and more particularly, to display apparatuses and methods of operating the display apparatuses.

DESCRIPTION OF THE RELATED ART

A liquid crystal display (LCD) apparatus may include a first substrate including a pixel electrode, a second substrate including a common electrode, and a liquid crystal layer disposed between the first and second substrates. Voltages may be applied to the pixel electrode and the common electrode to generate an electric field in the liquid crystal layer. Transmittance of light passing through the liquid crystal layer may be controlled according to the electric field, and thus, an image may be displayed.

The LCD apparatus may have a side visibility that is less than its front visibility. To increase the side visibility, the LCD apparatus may be operated with a driving scheme where adjacent pixels in the LCD apparatus are defined as one dot and the pixels in the one dot are driven based on different data voltages.

SUMMARY

An exemplary embodiment of the present inventive concept provides a display apparatus capable of increasing display quality, transmittance and visibility.

An exemplary embodiment of the present inventive concept provides a method of operating the display apparatus.

According to an exemplary embodiment of the present inventive concept, a display apparatus includes a timing controller and a display panel. The timing controller generates first and second image data based on input image data and generates output image data based on the first and second image data. The first image data corresponds to a boundary region in a first image. The second image data corresponds to a non-boundary region in the first image. The display panel includes a plurality of pixels and displays the first image based on the output image data. The plurality of pixels include boundary pixels corresponding to the boundary region and non-boundary pixels corresponding to the non-boundary region. The boundary pixels operate based on a reference gamma curve. The non-boundary pixels operate based on first and second gamma curves different from the reference gamma curve.

A luminance of an image based on the first gamma curve may be equal to or higher than a luminance of an image based on the reference gamma curve, and a luminance of an image based on the second gamma curve may be equal to or lower than the luminance of the image based on the reference gamma curve.

In an exemplary embodiment of the present inventive concept, the non-boundary pixels may include first non-boundary pixels and second non-boundary pixels. A distance between the boundary region and each of the first non-boundary pixels may be longer than a reference distance. A distance between the boundary region and each of the second non-boundary pixels may be equal to or shorter than the reference distance. The first non-boundary pixels may operate based on the first and second gamma curves, and the second non-boundary pixels may operate based on third and fourth gamma curves different from the first and second gamma curves and the reference gamma curve.

A luminance of an image based on the first gamma curve may be equal to or higher than a luminance of an image based on the third gamma curve, the luminance of the image based on the third gamma curve may be equal to or higher than a luminance of an image based on the reference gamma curve, a luminance of an image based on the fourth gamma curve may be equal to or lower than the luminance of the image based on the reference gamma curve, and a luminance of an image based on the second gamma curve may be equal to or lower than the luminance of the image based on the fourth gamma curve.

In an exemplary embodiment of the present inventive concept, the boundary region may include a plurality of dots. A first dot among the plurality of dots may include a first non-boundary pixel and a second non-boundary pixel. The first non-boundary pixel may operate based on the first gamma curve. The second non-boundary pixel may be adjacent to the first non-boundary pixel and may operate based on the second gamma curve.

In an exemplary embodiment of the present inventive concept, the first and second non-boundary pixels may be disposed in a same row or a same column.

In an exemplary embodiment of the present inventive concept, the first dot may further include a third non-boundary pixel. The third non-boundary pixel may be adjacent to one of the first and second non-boundary pixels and may operate based on the second gamma curve.

In an exemplary embodiment of the present inventive concept, the third non-boundary pixel and at least one of the first and second non-boundary pixels may be disposed in a same row or a same column.

In an exemplary embodiment of the present inventive concept, the first dot may further include a fourth non-boundary pixel. The fourth non-boundary pixel may be adjacent to at least one of the first, second and third non-boundary pixels and may operate based on the second gamma curve.

The timing controller may include an image analyzer and an image processor. The image analyzer may extract high frequency components and low frequency components from the input image data, may determine that the high frequency components correspond to the boundary region, may determine that the low frequency components correspond to the non-boundary region, and may generate the first image data including the high frequency components and the second image data including the low frequency components. The image processor may generate the output image data based on the first and second image data.

In an exemplary embodiment of the present inventive concept, the timing controller may further include a gamma storage. The gamma storage may store reference gamma data associated with the reference gamma curve, first gamma data associated with the first gamma curve and second gamma data associated with the second gamma curve. The image processor may generate a first portion of the output image data for the boundary pixels based on the first image data and the reference gamma data, and may generate a second portion of the output image data for the non-boundary pixels based on the second image data and the first and second gamma data.

In an exemplary embodiment of the present inventive concept, the display apparatus may further include a grayscale voltage generator and a data driver. The grayscale voltage generator may generate a first reference grayscale voltage corresponding to the reference gamma curve, a second reference grayscale voltage corresponding to the first gamma curve and a third reference grayscale voltage corresponding to the second gamma curve. The data driver may generate first data voltages to be applied to the boundary pixels based on the first reference grayscale voltage and a first portion of the output image data, and may generate second data voltages to be applied to the non-boundary pixels based on the second and third reference grayscale voltages and a second portion of the output image data.

According to an exemplary embodiment of the present inventive concept, a display apparatus includes a timing controller and a display panel. The timing controller generates output image data based on input image data and boundary data provided from a graphic processor. The boundary data includes information of a boundary region in a first image and information of a non-boundary region in the first image. The display panel includes a plurality of pixels and displays the first image based on the output image data. The plurality of pixels include boundary pixels corresponding to the boundary region and non-boundary pixels corresponding to the non-boundary region. The boundary pixels operate based on a reference gamma curve. The non-boundary pixels operate based on first and second gamma curves different from the reference gamma curve.

A luminance of an image based on the first gamma curve may be equal to or higher than a luminance of an image based on the reference gamma curve, and a luminance of an image based on the second gamma curve may be equal to or lower than the luminance of the image based on the reference gamma curve.

In an exemplary embodiment of the present inventive concept, the non-boundary pixels may include first non-boundary pixels and second non-boundary pixels. A distance between the boundary region and each of the first non-boundary pixels may be longer than a reference distance. A distance between the boundary region and each of the second non-boundary pixels may be equal to or shorter than the reference distance. The first non-boundary pixels may operate based on the first and second gamma curves, and the second non-boundary pixels may operate based on third and fourth gamma curves different from the first and second gamma curves and the reference gamma curve.

A luminance of an image based on the first gamma curve may be equal to or higher than a luminance of an image based on the third gamma curve, the luminance of the image based on the third gamma curve may be equal to or higher than a luminance of an image based on the reference gamma curve, a luminance of an image based on the fourth gamma curve may be equal to or lower than the luminance of the image based on the reference gamma curve, and a luminance of an image based on the second gamma curve may be equal to or lower than the luminance of the image based on the fourth gamma curve.

In an exemplary embodiment of the present inventive concept, the boundary region may include a plurality of dots. A first dot among the plurality of dots may include a first non-boundary pixel and a second non-boundary pixel. The first non-boundary pixel may operate based on the first gamma curve. The second non-boundary pixel may be adjacent to the first non-boundary pixel and may operate based on the second gamma curve.

In an exemplary embodiment of the present inventive concept, the first and second non-boundary pixels may be disposed in a same row or a same column.

In an exemplary embodiment of the present inventive concept, the first dot may further include a third non-boundary pixel. The third non-boundary pixel may be adjacent to one of the first and second non-boundary pixels and may operate based on the second gamma curve.

In an exemplary embodiment of the present inventive concept, the third non-boundary pixel and at least one of the first and second non-boundary pixels may be disposed in a same row or a same column.

In an exemplary embodiment of the present inventive concept, the first dot may further include a fourth non-boundary pixel. The fourth non-boundary pixel may be adjacent to at least one of the first, second and third non-boundary pixels and may operate based on the second gamma curve.

The timing controller may include an image divider and an image processor. The image divider may divide the input image data into first image data corresponding to the boundary region and second image data corresponding to the non-boundary region based on the boundary data. The image processor may generate the output image data based on the first and second image data.

In an exemplary embodiment of the present inventive concept, the timing controller may further include a gamma storage. The gamma storage may store reference gamma data associated with the reference gamma curve, first gamma data associated with the first gamma curve and second gamma data associated with the second gamma curve. The image processor may generate a first portion of the output image data for the boundary pixels based on the first image data and the reference gamma data, and may generate a second portion of the output image data for the non-boundary pixels based on the second image data and the first and second gamma data.

In an exemplary embodiment of the present inventive concept, the display apparatus may further include a grayscale voltage generator and a data driver. The grayscale voltage generator may generate a first reference grayscale voltage corresponding to the reference gamma curve, a second reference grayscale voltage corresponding to the first gamma curve and a third reference grayscale voltage corresponding to the second gamma curve. The data driver may generate first data voltages to be applied to the boundary pixels based on the first reference grayscale voltage and a first portion of the output image data, and may generate second data voltages to be applied to the non-boundary pixels based on the second and third reference grayscale voltages and a second portion of the output image data.

According to an exemplary embodiment of the present inventive concept, in a method of operating a display apparatus, first and second image data are generated based on input image data. The first image data corresponds to a boundary region in a first image. The second image data corresponds to a non-boundary region in the first image. Output image data is generated based on the first and second image data. The first image is displayed on a display panel including a plurality of pixels based on the output image data. The plurality of pixels include boundary pixels corresponding to the boundary region and non-boundary pixels corresponding to the non-boundary region. The boundary pixels operate based on a reference gamma curve. The non-boundary pixels operate based on first and second gamma curves different from the reference gamma curve.

A luminance of an image based on the first gamma curve may be equal to or higher than a luminance of an image based on the reference gamma curve, and a luminance of an image based on the second gamma curve may be equal to or lower than the luminance of the image based on the reference gamma curve.

In an exemplary embodiment of the present inventive concept, the non-boundary pixels may include first non-boundary pixels and second non-boundary pixels. A distance between the boundary region and each of the first non-boundary pixels may be longer than a reference distance. A distance between the boundary region and each of the second non-boundary pixels may be equal to or shorter than the reference distance. The first non-boundary pixels may operate based on the first and second gamma curves, and the second non-boundary pixels may operate based on third and fourth gamma curves different from the first and second gamma curves and the reference gamma curve.

A luminance of an image based on the first gamma curve may be equal to or higher than a luminance of an image based on the third gamma curve, the luminance of the image based on the third gamma curve may be equal to or higher than a luminance of an image based on the reference gamma curve, a luminance of an image based on the fourth gamma curve may be equal to or lower than the luminance of the image based on the reference gamma curve, and a luminance of an image based on the second gamma curve may be equal to or lower than the luminance of the image based on the fourth gamma curve.

In generating the first and second image data, high frequency components and low frequency components may be extracted from the input image data. A region corresponding to the high frequency components may be determined to be the boundary region. A region corresponding to the low frequency components may be determined to be the non-boundary region. The first image data including the high frequency components and the second image data including the low frequency components may be generated.

In generating the output image data, a first portion of the output image data for the boundary pixels may be generated based on the first image data and reference gamma data associated with the reference gamma curve. A second portion of the output image data for the non-boundary pixels may be generated based on the second image data, first gamma data associated with the first gamma curve and second gamma data associated with the second gamma curve.

In displaying the first image on the display panel, first data voltages may be generated based on a first portion of the output image data and a first reference grayscale voltage corresponding to the reference gamma curve, and the first data voltages may be applied to the boundary pixels. Second data voltages may be generated based on a second portion of the output image data, a second reference grayscale voltage corresponding to the first gamma curve and a third reference grayscale voltage corresponding to the second gamma curve, and the second data voltages may be applied to the non-boundary pixels.

According to an exemplary embodiment of the present inventive concept, in a method of operating a display apparatus, output image data is generated based on input image data and boundary data provided from a graphic processor. The boundary data includes information of a boundary region in a first image and information of a non-boundary region in the first image. The first image is displayed on a display panel including a plurality of pixels based on the output image data. The plurality of pixels include boundary pixels corresponding to the boundary region and non-boundary pixels corresponding to the non-boundary region. The boundary pixels operate based on a reference gamma curve. The non-boundary pixels operate based on first and second gamma curves different from the reference gamma curve.

According to an exemplary embodiment of the present inventive concept, a display apparatus includes a timing control circuit that generates first image data and second image data in response to input image data and generates output image data in response to the first and second image data, the first image data corresponding to an edge between an object and a background in an image, the second image data corresponding to a surface of the object; and a display panel that displays the image in response to the output image data, the display panel including first pixels corresponding to the first image data and driven by a first driving scheme, and second pixels corresponding to the second image data and driven by a second driving scheme different from the first driving scheme.

In the second driving scheme the second pixels are driven based on a plurality of different gamma curves.

The gamma curves used to drive the second pixels are determined according to a distance of the second pixels from the edge.

BRIEF DESCRIPTION OF THE DRAWINGS

The above and other features of the present inventive concept will become more apparent by describing in detail exemplary embodiments thereof with reference to the accompanying drawings.

DETAILED DESCRIPTION OF THE EMBODIMENTS

Figure 1:
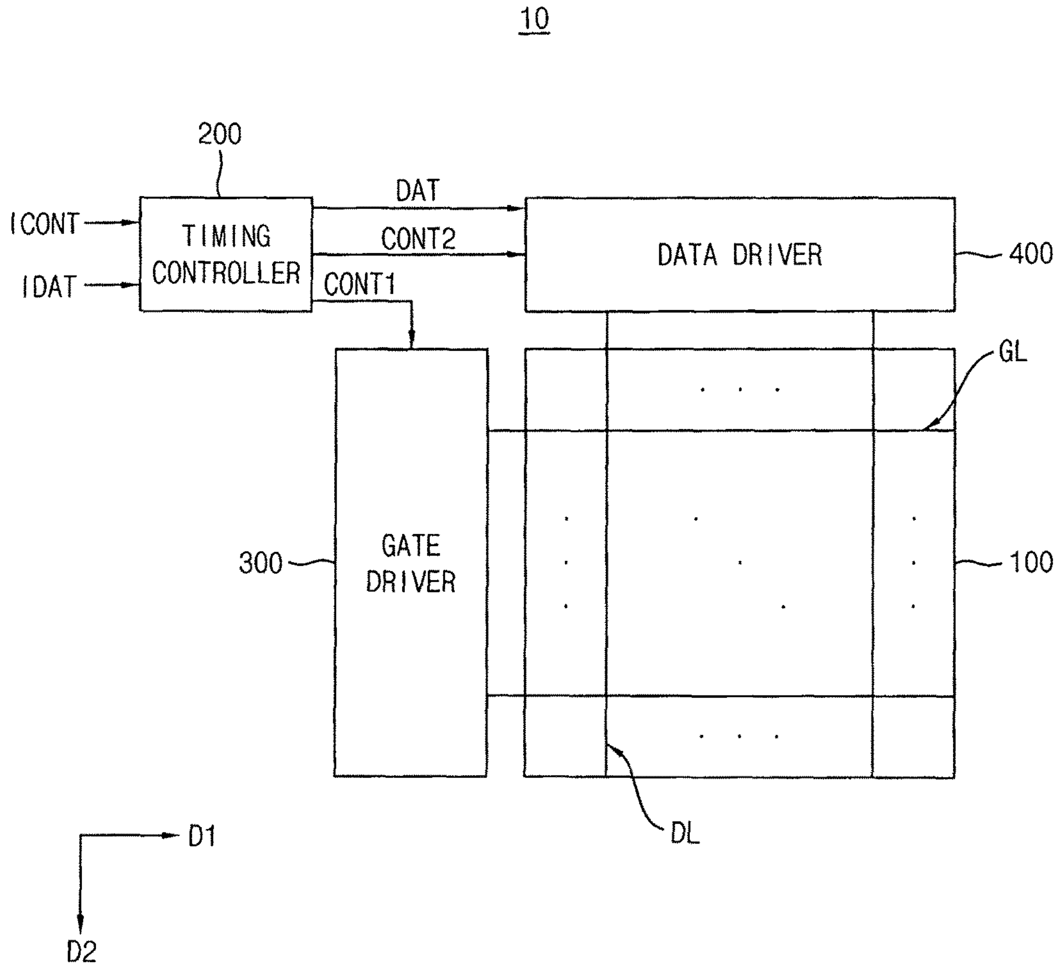
FIG. 1 is a block diagram illustrating a display apparatus according to an exemplary embodiment of the present inventive concept.

Exemplary embodiments of the present inventive concept will be described more fully hereinafter with reference to the accompanying drawings. This inventive concept may, however, be embodied in many different forms and should not be construed as limited to the embodiments set forth herein. Like reference numerals may refer to like elements throughout this application.

FIG. 1 is a block diagram illustrating a display apparatus according to an exemplary embodiment of the present inventive concept.

Referring to FIG. 1, a display apparatus 10 includes a display panel 100, a timing controller 200, a gate driver 300 and a data driver 400.

The display panel 100 is connected to a plurality of gate lines GL and a plurality of data lines DL. The display panel 100 displays an image represented by a plurality of grayscales based on output image data DAT. The gate lines GL may extend in a first direction D1, and the data lines DL may extend in a second direction D2 crossing (e.g., substantially perpendicular to) the first direction D1.

The display panel 100 may include a plurality of pixels that are arranged in a matrix form. Each pixel may be electrically connected to a respective one of the gate lines GL and a respective one of the data lines DL.

In an exemplary embodiment of the present inventive concept, each pixel may include a switching element, a liquid crystal capacitor and a storage capacitor. The liquid crystal capacitor and the storage capacitor may be electrically connected to the switching element. For example, the switching element may be a thin film transistor. The liquid crystal capacitor may include a first electrode connected to a pixel electrode and a second electrode connected to a common electrode. A data voltage may be applied to the first electrode of the liquid crystal capacitor. A common voltage may be applied to the second electrode of the liquid crystal capacitor. The storage capacitor may include a first electrode connected to the pixel electrode and a second electrode connected to a storage electrode. The data voltage may be applied to the first electrode of the storage capacitor. A storage voltage may be applied to the second electrode of the storage capacitor. The storage voltage may be substantially equal to the common voltage.

Each pixel may have a rectangular shape. For example, each pixel may have a relatively short side in the first direction D1 and a relatively long side in the second direction D2. In other words, each pixel may extend lengthwise in the second direction D2. The relatively short side of each pixel may be substantially parallel to the gate lines GL. The relatively long side of each pixel may be substantially parallel to the data lines DL.

The timing controller 200 controls an operation of the display panel 100 and controls operations of the gate driver 300 and the data driver 400. The timing controller 200 receives input image data IDAT and an input control signal ICONT from an external device (e.g., a graphic processor). The input image data IDAT may include a plurality of input pixel data for the plurality of pixels. The input pixel data may include red grayscale data R, green grayscale data G and blue grayscale data B. The input control signal ICONT may include a master clock signal, a data enable signal, a vertical synchronization signal, a horizontal synchronization signal, etc.

The timing controller 200 generates the output image data DAT, a first control signal CONT1 and a second control signal CONT2 based on the input image data IDAT and the input control signal ICONT.

The timing controller 200 may generate the output image data DAT based on the input image data IDAT. The output image data DAT may be provided to the data driver 400. The timing controller 200 may generate the first control signal CONT1 based on the input control signal ICONT. The first control signal CONT1 may be provided to the gate driver 300, and a driving time of the gate driver 300 may be controlled based on the first control signal CONT1. The first control signal CONT1 may include a vertical start signal, a gate clock signal, etc. The timing controller 200 may generate the second control signal CONT2 based on the input control signal ICONT. The second control signal CONT2 may be provided to the data driver 400, and a driving time of the data driver 400 may be controlled based on the second control signal CONT2. The second control signal CONT2 may include a horizontal start signal, a data clock signal, a data load signal, a polarity control signal, etc.

The gate driver 300 receives the first control signal CONT1 from the timing controller 200. The gate driver 300 generates a plurality of gate signals for driving the gate lines GL based on the first control signal CONT1. The gate driver 300 may sequentially apply the gate signals to the gate lines GL.

The data driver 400 receives the second control signal CONT2 and the output image data DAT from the timing controller 200. The data driver 400 generates a plurality of analog data voltages based on the second control signal CONT2 and the digital output image data DAT. The data driver 400 may apply the data voltages to the data lines DL.

In an exemplary embodiment of the present inventive concept, the data driver 400 may include a shift register, a latch, a signal processor and a buffer. The shift register may output a latch pulse to the latch. The latch may temporarily store the output image data, and may output the output image data to the signal processor. The signal processor may generate the analog data voltages based on the digital output image data and may output the analog data voltages to the buffer. The buffer may output the analog data voltages to the data lines DL.

In an exemplary embodiment of the present inventive concept, the gate driver 300 and/or the data driver 400 may be disposed, e.g., directly mounted, on the display panel 100, or may be connected to the display panel 100 in a tape carrier package (TCP). The gate driver 300 and/or the data driver 400 may be integrated on the display panel 100.

An image displayed on the display panel 100 may include a boundary region and a non-boundary region other than the boundary region. The boundary region may be a region that includes a boundary (or an edge) between an object (or a subject) and a background and/or a boundary between at least two objects. In the display apparatus 10 according to an exemplary embodiment of the present inventive concept, the boundary region and the non-boundary region may be driven by different driving schemes.

Hereinafter, a display apparatus and a method of operating the display apparatus according to an exemplary embodiment of the present inventive concept will be explained in detail with reference to example configurations of pixels and dots included in the display panel 100 and gamma curves used in the display apparatus 10.

Figure 2:
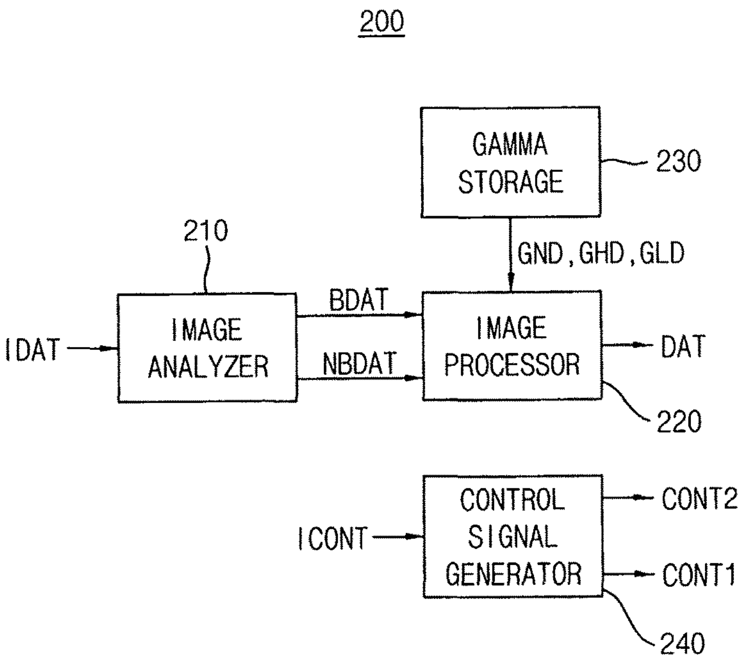
FIG. 2 is a block diagram illustrating a timing controller included in the display apparatus of FIG. 1 according to an exemplary embodiment of the present inventive concept.
Figure 3:
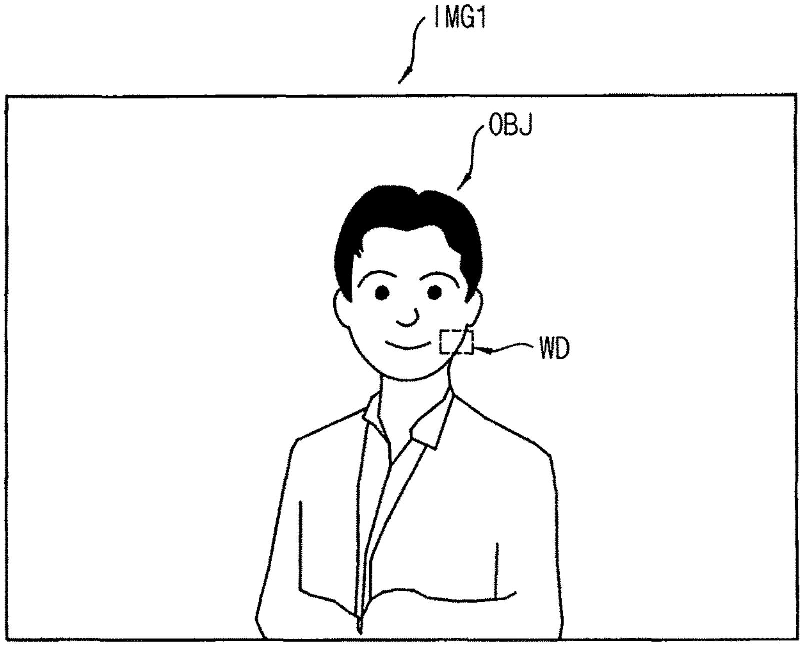
FIGS. 3, 4 and 5 are diagrams for describing an operation of the display apparatus of FIG. 1 according to exemplary embodiments of the present inventive concept.
Figure 4:
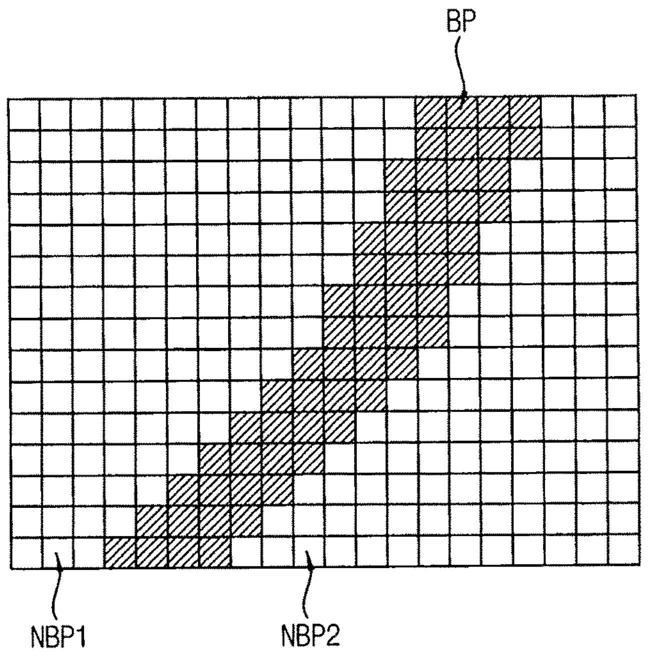
Figure 5:
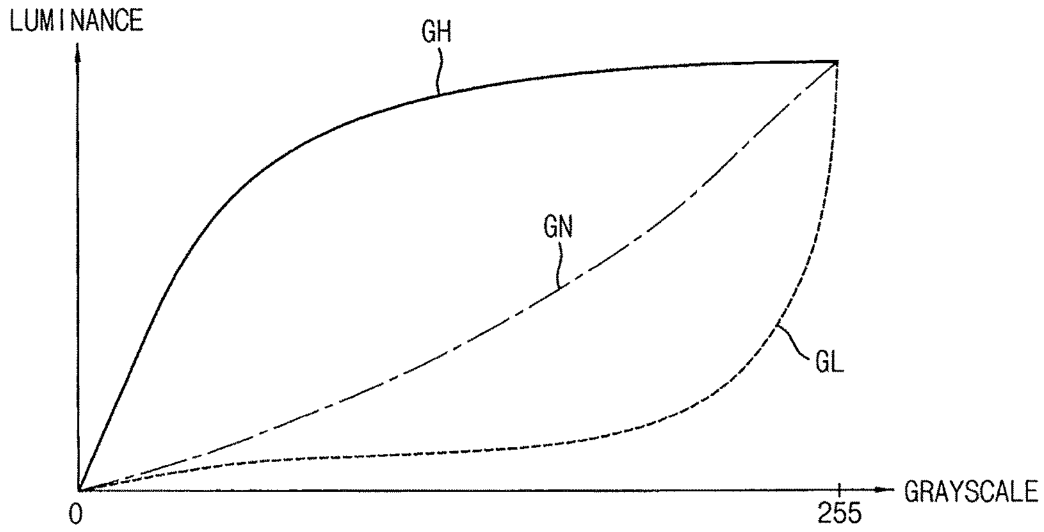

FIG. 2 is a block diagram illustrating a timing controller included in the display apparatus 10 according to an exemplary embodiment of the present inventive concept. FIGS. 3, 4 and 5 are diagrams for describing an operation of the display apparatus 10 according to exemplary embodiments of the present inventive concept. FIG. 3 illustrates an example of an image displayed on the display panel 100 in the display apparatus 10. FIG. 4 is an enlarged view of a portion "WD" in FIG. 3. FIG. 5 illustrates an example of gamma curves used in the display apparatus 10.

Referring to FIGS. 1, 2, 3, 4 and 5, the timing controller 200 generates first image data BDAT and second image data NBDAT by analyzing the input image data IDAT and generates the output image data DAT based on the first and second image data BDAT and NBDAT. The first image data BDAT corresponds to a boundary region in a first image that is displayed on the display panel 100 based on the input image data IDAT. The second image data NBDAT corresponds to a non-boundary region other than the boundary region in the first image.

In an exemplary embodiment of the present inventive concept, as illustrated in FIG. 3, a first image IMG1 may include an object OBJ. A boundary region in the first image IMG1 may be a region where a grayscale is significantly changed. For example, the boundary region in the first image IMG1 may include a boundary between the object OBJ and a background. For example, when an image includes a plurality of objects, a boundary region in the image may include boundaries between the plurality of objects and boundaries between the plurality of objects and a background.

The display panel 100 displays the first image IMG1 based on the output image data DAT. The plurality of pixels in the display panel 100 are divided into boundary pixels corresponding to the boundary region and non-boundary pixels corresponding to the non-boundary region.

In an exemplary embodiment of the present inventive concept, as illustrated in FIGS. 3 and 4, when a window WD (e.g., a portion of the first image IMG1) in FIG. 3 is enlarged, pixels in the window WD may be divided into boundary pixels BP (e.g., diagonal-lined quadrangles in FIG. 4) and non-boundary pixels NBP1 and NBP2 (e.g., empty quadrangles in FIG. 4). The non-boundary pixels NBP1 may represent a portion of the object OBJ in the first image IMG1, and the non-boundary pixels NBP2 may represent a portion of the background in the first image IMG1. Each of the plurality of pixels in the display panel 100 may be one of the boundary pixel and the non-boundary pixel.

The boundary pixels in the display panel 100 operate based on a reference gamma curve, and the non-boundary pixels in the display panel 100 operate based on a first gamma curve and a second gamma curve. Each of the first and second gamma curves is different from the reference gamma curve. A gamma curve may indicate a relationship between a plurality of grayscales of an image and luminances or transmittances of the display panel 100. At least one gamma data and/or at least one grayscale voltage may be set based on the gamma curve.

In an exemplary embodiment of the present inventive concept, the reference gamma curve may be determined to substantially maximize a display quality of the display panel 100. For example, the reference gamma curve may be a gamma curve with a gamma value of about 2.2.

In an exemplary embodiment of the present inventive concept, as illustrated in FIG. 5, a luminance of an image based on a first gamma curve GH may be equal to or higher than a luminance of an image based on a reference gamma curve GN, and a luminance of an image based on a second gamma curve GL may be equal to or lower than the luminance of the image based on the reference gamma curve GN. A composite gamma curve of the first and second gamma curves GH and GL may be substantially the same as the reference gamma curve GN.

A pixel operating based on the reference gamma curve GN may display an image having a luminance that is substantially the same as a target luminance. A driving scheme based on the reference gamma curve GN may be referred to as a normal driving scheme. The normal driving scheme will be described in detail with reference to FIG. 10.

A pixel operating based on the first gamma curve GH may display an image having a luminance that is higher than the target luminance, and a pixel operating based on the second gamma curve GL may display an image having a luminance that is lower than the target luminance. When one of two adjacent pixels operates based on the first gamma curve GH, and when the other of the two adjacent pixels operates based on the second gamma curve GL, an image having the target luminance may be displayed by the two adjacent pixels by combining the image having the lower luminance with the image having the higher luminance. A driving scheme based on the first and second gamma curves GH and GL may be referred to as a spatial gamma mixing (SGM) scheme. The SGM scheme will be described in detail with reference to FIGS. 11A, 11B, 12A, 12B, 12C, 13A, 13B and 13C.

In an exemplary embodiment of the present inventive concept, as illustrated in FIG. 2, the timing controller 200 may include an image analyzer 210, an image processor 220, a gamma storage 230 and a control signal generator 240.

The image analyzer 210 may analyze the input image data IDAT to extract high frequency components and low frequency components from the input image data IDAT. The image analyzer 210 may determine a region corresponding to the high frequency components as the boundary region and may determine a region corresponding to the low frequency components as the non-boundary region. The image analyzer 210 may generate the first image data BDAT including the high frequency components and the second image data NBDAT including the low frequency components. For example, the high frequency components may be obtained when a difference between grayscales of adjacent pixels is relatively great (e.g., when the difference is equal to or greater than a threshold value). The low frequency components may be obtained when a difference between grayscales of adjacent pixels is relatively small (e.g., when the difference is less than the threshold value).

The gamma storage 230 may store reference gamma data GND associated with the reference gamma curve GN, first gamma data GHD associated with the first gamma curve GH and second gamma data GLD associated with the second gamma curve GL. For example, the gamma storage 230 may include at least one nonvolatile memory such as an erasable programmable read-only memory (EPROM), an electrically erasable programmable read-only memory (EEPROM), a flash memory, a phase change random access memory (PRAM), a resistance random access memory (RRAM), a magnetic random access memory (MRAM), a ferroelectric random access memory (FRAM), a nano floating gate memory (NFGM), a polymer random access memory (PoRAM), etc.

The image processor 220 may generate the output image data DAT based on the first and second image data BDAT and NBDAT. For example, the image processor 220 may generate a first portion of the output image data DAT for the boundary pixels (e.g., BP in FIG. 4) based on the first image data BDAT and the reference gamma data GND. The image processor 220 may generate a second portion of the output image data DAT for the non-boundary pixels (e.g., NBP1 and NBP2 in FIG. 4) based on the second image data NBDAT and the first and second gamma data GHD and GLD.

In an exemplary embodiment of the present inventive concept, the image processor 220 may selectively perform an image quality compensation, a spot compensation, an adaptive color correction (ACC), and/or a dynamic capacitance compensation (DCC) on the first and second image data BDAT and NBDAT to generate the output image data DAT.

The control signal generator 240 may receive the input control signal ICONT. The control signal generator 240 may generate the first control signal CONT1 for the gate driver 300 and the second control signal CONT2 for the data driver 400 based on the input control signal CONT. The control signal generator 240 may output the first control signal CONT1 to the gate driver 300 and may output the second control signal CONT2 to the data driver 400.

In the display apparatus 10 according to an exemplary embodiment of the present inventive concept, the normal driving scheme may be employed for pixels in the boundary region (e.g., the boundary pixels BP in FIG. 4), and the SGM scheme may be employed for pixels in the non-boundary region (e.g., the non-boundary pixels NBP1 and NBP2 in FIG. 4). Accordingly, a resolution of the boundary region may be prevented from being degraded, and further, the display panel 100 may thus have a relatively high transmittance, a relatively increased visibility and a relatively increased display quality. A driving scheme where one of the normal driving scheme and the SGM scheme is employed depending on whether the boundary region is detected may be referred to as an edged SGM (ESGM) scheme.

Figure 6:
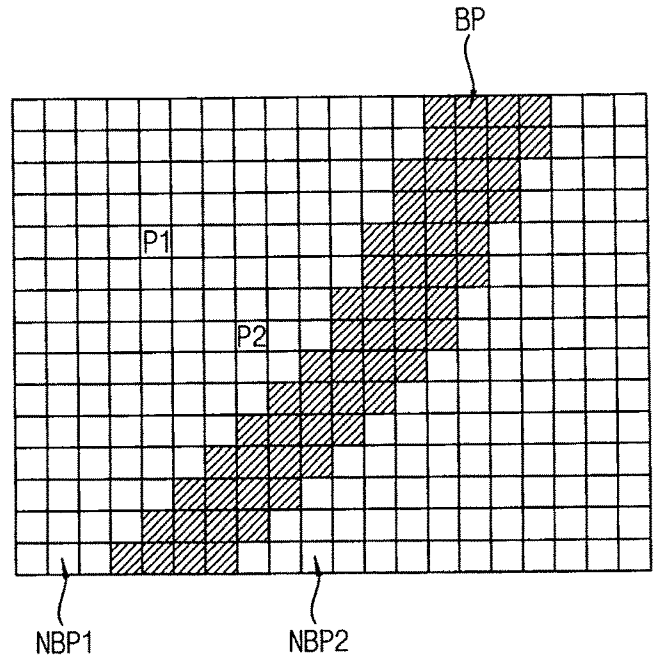
FIGS. 6, 7, 8 and 9 are diagrams for describing an operation of the display apparatus of FIG. 1 according to exemplary embodiments of the present inventive concept.
Figure 7:
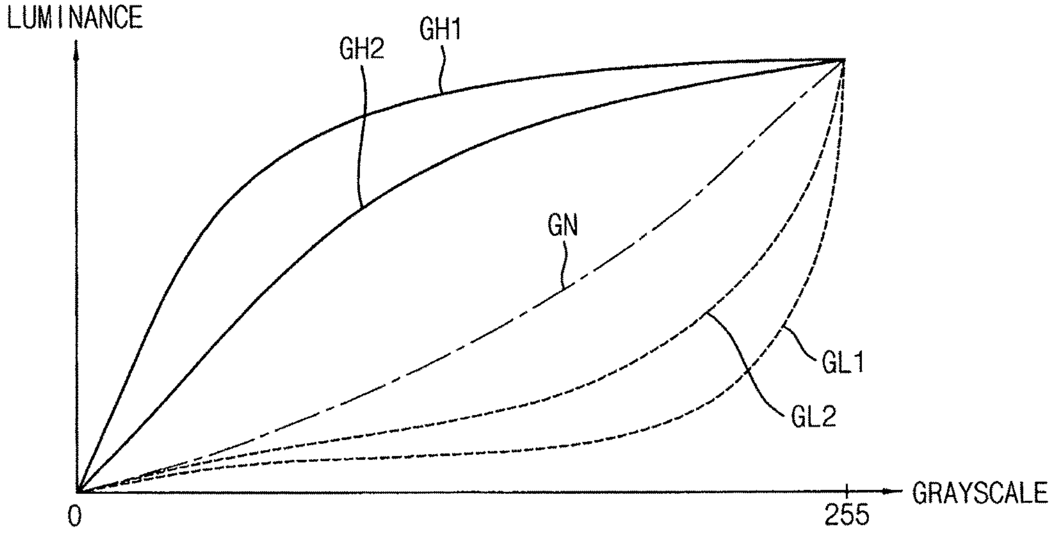
Figure 8:
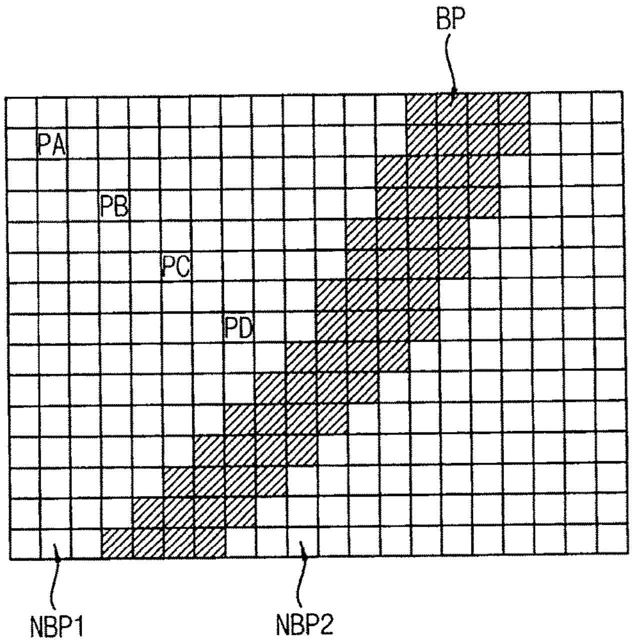
Figure 9:
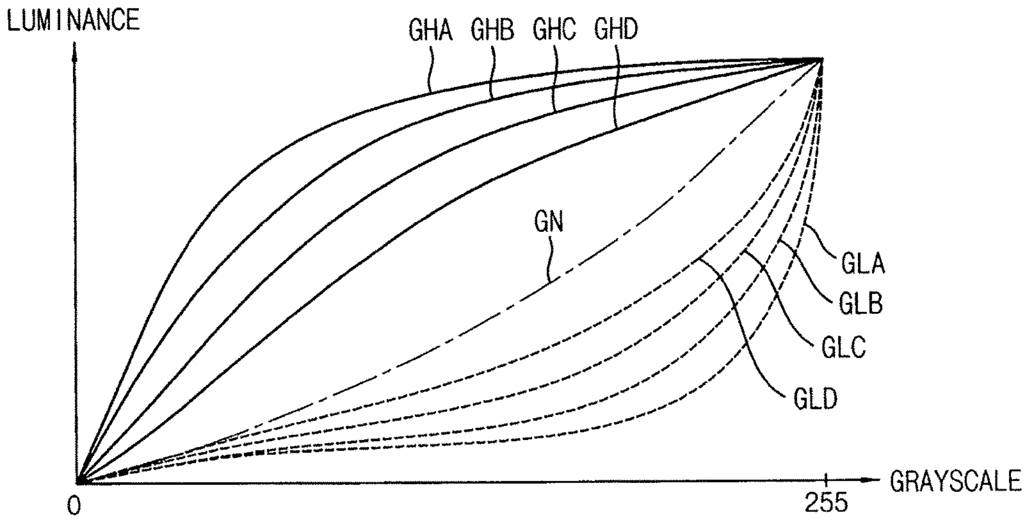

FIGS. 6, 7, 8 and 9 are diagrams for describing an operation of the display apparatus 10 according to exemplary embodiments of the present inventive concept. FIGS. 6 and 8 are enlarged views of the portion “WD” in FIG. 3. FIGS. 7 and 9 illustrate examples of gamma curves used in the display apparatus 10.

Referring to FIGS. 2, 3, 6, 7, 8 and 9, the boundary pixels BP corresponding to the boundary region in the first image IMG1 may operate based on the reference gamma curve GN. The non-boundary pixels NBP1 and NBP2 corresponding to the non-boundary region in the first image IMG1 may operate based on gamma curves different from the reference gamma curve GN. Since the boundary pixels BP and the non-boundary pixels NBP1 and NBP2 operate based on different driving schemes, a viewer may recognize a difference between the boundary region and the non-boundary region. To make the difference between the boundary region and the non-boundary region not recognizable by the viewer, a relatively large number (e.g., more than two) of gamma curves may be used for operating the non-boundary pixels NBP1 and NBP2.

In an exemplary embodiment of the present inventive concept, as illustrated in FIGS. 6 and 7, the non-boundary pixels NBP1 and NBP2 may include first non-boundary pixels (e.g., P1 in FIG. 6) and second non-boundary pixels (e.g., P2 in FIG. 6). The second non-boundary pixels may be closer to the boundary region than the first non-boundary pixels. The first non-boundary pixels may operate based on first and second gamma curves (e.g., GH1 and GL1 in FIG. 7) different from the reference gamma curve (e.g., GN in FIG. 7). The second non-boundary pixels may operate based on third and fourth gamma curves (e.g., GH2 and GL2 in FIG. 7) different from the first and second gamma curves and the reference gamma curve (e.g., GN in FIG. 7).

For example, as illustrated in FIG. 6, a distance between the boundary region and one pixel P1 of the first non-boundary pixels may be longer than a reference distance. A distance between the boundary region and one pixel P2 of the second non-boundary pixels may be equal to or shorter than the reference distance. In the example of FIG. 6, the reference distance may be about four pixel distances, where one pixel distance is a diagonal length of one pixel. However, the distance is not limited thereto and may be a straight length of a pixel from one side to another. The pixel P1 that is relatively far away from the boundary region may operate based on one of the first and second gamma curves GH1 and GL1. The pixel P2 that is relatively close to the boundary region may operate based on one of the third and fourth gamma curves GH2 and GL2.

In addition, as illustrated in FIG. 7, a luminance of an image based on the first gamma curve GH1 may be equal to or higher than a luminance of an image based on the third gamma curve GH2. The luminance of the image based on the third gamma curve GH2 may be equal to or higher than a luminance of an image based on the reference gamma curve GN. A luminance of an image based on the fourth gamma curve GL2 may be equal to or lower than the luminance of the image based on the reference gamma curve GN. A luminance of an image based on the second gamma curve GL1 may be equal to or lower than the luminance of the image based on the fourth gamma curve GL2. In other words, the third and fourth gamma curves GH2 and GL2 may be more approximate to the reference gamma curve GN than the first and second gamma curves GH1 and GL1.

In the example of FIG. 7, a first composite gamma curve of the first and second gamma curves GH1 and GL1 may be substantially the same as the reference gamma curve GN, and a second composite gamma curve of the third and fourth gamma curves GH2 and GL2 may be substantially the same as the reference gamma curve GN.

To operate based on the examples of FIGS. 6 and 7, the gamma storage 230 may store reference gamma data associated with the reference gamma curve GN, first gamma data associated with the first gamma curve GH1, second gamma data associated with the second gamma curve GL1, third gamma data associated with the third gamma curve GH2 and fourth gamma data associated with the fourth gamma curve GL2. The image processor 220 may generate portions of the output image data DAT for the boundary pixels BP based on the first image data BDAT and the reference gamma data. The image processor 220 may generate other portions of the output image data DAT for the non-boundary pixels NBP1 and NBP2 based on the second image data NBDAT and the first, second, third and fourth gamma data.

In an exemplary embodiment of the present inventive concept, as illustrated in FIGS. 8 and 9, the non-boundary pixels NBP1 and NBP2 may include first non-boundary pixels (e.g., PA in FIG. 8), second non-boundary pixels (e.g., PB in FIG. 8), third non-boundary pixels (e.g., PC in FIG. 8) and fourth non-boundary pixels (e.g., PD in FIG. 8). The second non-boundary pixels may be closer to the boundary region than the first non-boundary pixels, the third non-boundary pixels may be closer to the boundary region than the second non-boundary pixels, and the fourth non-boundary pixels may be closer to the boundary region than the third non-boundary pixels. The first non-boundary pixels may operate based on first and second gamma curves (e.g., GHA and GLA in FIG. 9), the second non-boundary pixels may operate based on third and fourth gamma curves (e.g., GHB and GLB in FIG. 9), the third non-boundary pixels may operate based on fifth and sixth gamma curves (e.g., GHC and GLC in FIG. 9), and the fourth non-boundary pixels may operate based on seventh and eighth gamma curves (e.g., GHD and GLD in FIG. 9).

For example, as illustrated in FIG. 8, a distance between the boundary region and one pixel PA of the first non-boundary pixels may be longer than a first reference distance. A distance between the boundary region and one pixel PB of the second non-boundary pixels may be equal to or shorter than the first reference distance and may be longer than a second reference distance. A distance between the boundary region and one pixel PC of the third non-boundary pixels may be equal to or shorter than the second reference distance and may be longer than a third reference distance. A distance between the boundary region and one pixel PD of the fourth non-boundary pixels may be equal to or shorter than the third reference distance. The second reference distance may be shorter than the first reference distance and may be longer than the third reference distance. In the example of FIG. 8, the first reference distance may be about seven pixel distances, the second reference distance may be about five pixel distances, and the third reference distance may be about three pixel distances, where one pixel distance is a diagonal length of one pixel. The pixel PA may operate based on one of the first and second gamma curves GHA and GLA, the pixel PB may operate based on one of the third and fourth gamma curves GHB and GLB, the pixel PC may operate based on one of the fifth and sixth gamma curves GHC and GLC, and the pixel PD may operate based on one of the seventh and eighth gamma curves GHD and GLD.

In addition, as illustrated in FIG. 9, a luminance of an image based on the first gamma curve GHA may be equal to or higher than a luminance of an image based on the third gamma curve GHB. The luminance of the image based on the third gamma curve GHB may be equal to or higher than a luminance of an image based on the fifth gamma curve GHC. The luminance of the image based on the fifth gamma curve GHC may be equal to or higher than a luminance of an image based on the seventh gamma curve GHD. The luminance of the image based on the seventh gamma curve GHD may be equal to or higher than a luminance of an image based on the reference gamma curve GN. A luminance of an image based on the eighth gamma curve GLD may be equal to or lower than the luminance of the image based on the reference gamma curve GN. A luminance of an image based on the sixth gamma curve GLC may be equal to or lower than the luminance of the image based on the eighth gamma curve GLD. A luminance of an image based on the fourth gamma curve GLB may be equal to or lower than the luminance of the image based on the sixth gamma curve GLC. A luminance of an image based on the second gamma curve GLA may be equal to or lower than the luminance of the image based on the fourth gamma curve GLB. In other words, the third and fourth gamma curves GHB and GLB may be more approximate to the reference gamma curve GN than the first and second gamma curves GHA and GLA, the fifth and sixth gamma curves GHC and GLC may be more approximate to the reference gamma curve GN than the third and fourth gamma curves GHB and GLB, and the seventh and eighth gamma curves GHD and GLD may be more approximate to the reference gamma curve GN than the fifth and sixth gamma curves GHC and GLC.

In the example of FIG. 9, a first composite gamma curve of the first and second gamma curves GHA and GLA, a second composite gamma curve of the third and fourth gamma curves GHB and GLB, a third composite gamma curve of the fifth and sixth gamma curves GHC and GLC, and a fourth composite gamma curve of the seventh and eighth gamma curves GHD and GLD may be substantially the same as the reference gamma curve GN.

With reference to FIGS. 6, 7, 8 and 9, a driving scheme where the gamma curves for operating the non-boundary pixels NBP1 and NBP2 are changed based on the distances from the boundary region to the non-boundary pixels NBP1 and NBP2 may be referred to as a gradual gamma smoothing scheme.

Although the examples of the gradual gamma smoothing scheme are described based on two pairs of gamma curves (e.g., the example of FIGS. 6 and 7) and four pairs of gamma curves (e.g., the example of FIGS. 8 and 9), the number of the gamma curves for operating the non-boundary pixels NBP1 and NBP2 based on the gradual gamma smoothing scheme may not be limited thereto. For example, the gradual gamma smoothing scheme may be based on three pairs of gamma curves or more than four pairs of gamma curves.

Figure 10:
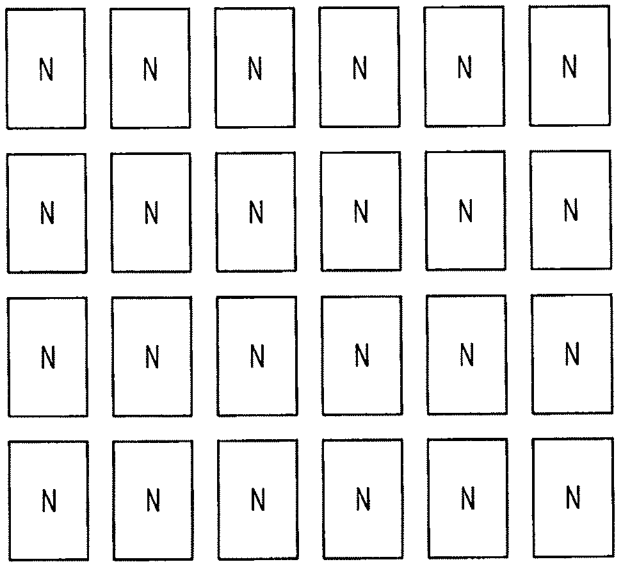
FIGS. 10, 11A, 11B, 12A, 12B, 12C, 13A, 13B and 13C are diagrams for describing an operation of the display apparatus of FIG. 1 according to exemplary embodiments of the present inventive concept.

FIGS. 10, 11A, 11B, 12A, 12B, 12C, 13A, 13B and 13C are diagrams for describing an operation of the display apparatus 10 according to exemplary embodiments of the present inventive concept. FIG. 10 illustrates an example of an operation of the boundary pixels in the display apparatus 10. FIGS. 11A, 11B, 12A, 12B, 12C, 13A, 13B and 13C illustrate examples of an operation of the non-boundary pixels in the display apparatus 10.

Referring to FIG. 10, the boundary pixels (e.g., BP in FIG. 4) in the display panel 100 may display images N based on the reference gamma curve (e.g., GN in FIG. 5). For example, data voltages applied to the boundary pixels may be generated based on the reference gamma curve. Accordingly, the resolution of the boundary region including the boundary pixels may not be degraded.

Referring to 11A, 11B, 12A, 12B, 12C, 13A, 13B and 13C, portions of the non-boundary pixels (e.g., NBP1 and NBP2 in FIG. 4) in the display panel 100 may display images H based on the first gamma curve (e.g., GH in FIG. 5). Other portions of the non-boundary pixels (e.g., NBP1 and NBP2 in FIG. 4) in the display panel 100 may display images L based on the second gamma curve (e.g., GL in FIG. 5). For example, first data voltages applied to a first portion of the non-boundary pixels may be generated based on the first gamma curve. Second data voltages applied to a second portion of the non-boundary pixels may be generated based on the second gamma curve. Accordingly, the display panel 100 may have a relatively high transmittance and a relatively increased visibility.

The non-boundary region driven by the SGM scheme may include a plurality of dots. Each of the plurality of dots may include M non-boundary pixels, where M is a natural number. In other words, adjacent M non-boundary pixels may form one dot. A single dot may be implemented with one of various shapes. One non-boundary pixel in the single dot may display the image H based on the first gamma curve, and the other (M−1) non-boundary pixels in the single dot may display the images L based on the second gamma curve.

In an exemplary embodiment of the present inventive concept, each of the plurality of dots may include two non-boundary pixels. A ratio of the number of non-boundary pixels operating based on the first gamma curve (e.g., GH in FIG. 5) and the number of non-boundary pixels operating based on the second gamma curve (e.g., GL in FIG. 5) may be about 1:1. The non-boundary pixels operating based on the first gamma curve and the non-boundary pixels operating based on the second gamma curve may be alternately disposed (e.g., disposed in an order of H, L, H, L, . . . ) in a row direction and/or a column direction.

Figure 11A:
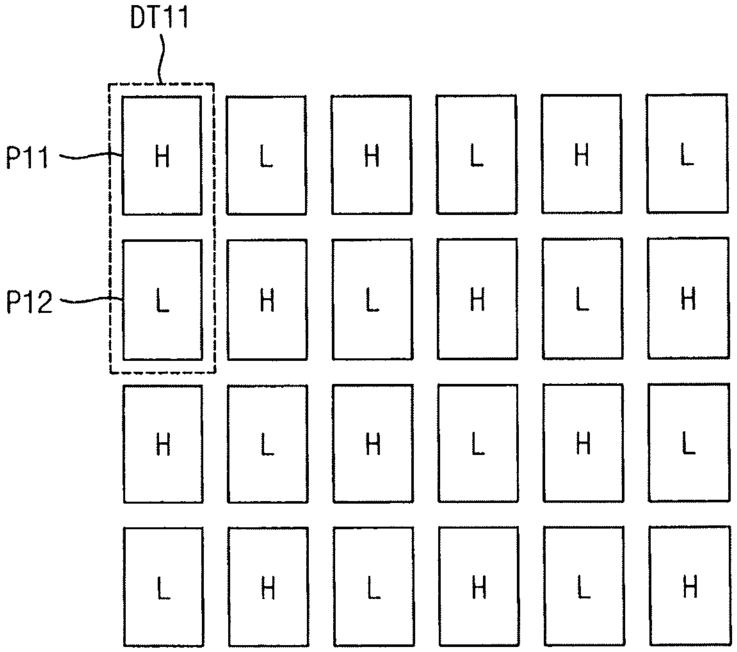

For example, as illustrated in FIG. 11A, a dot DT11 may include a first non-boundary pixel P11 and a second non-boundary pixel P12. The first non-boundary pixel P11 may operate based on the first gamma curve (e.g., GH in FIG. 5). The second non-boundary pixel P12 may be adjacent to the first non-boundary pixel P11 in the column direction and may operate based on the second gamma curve (e.g., GL in FIG. 5). In the example of FIG. 11A, the first and second non-boundary pixels P11 and P12 may be disposed in the same column.

Figure 11B:
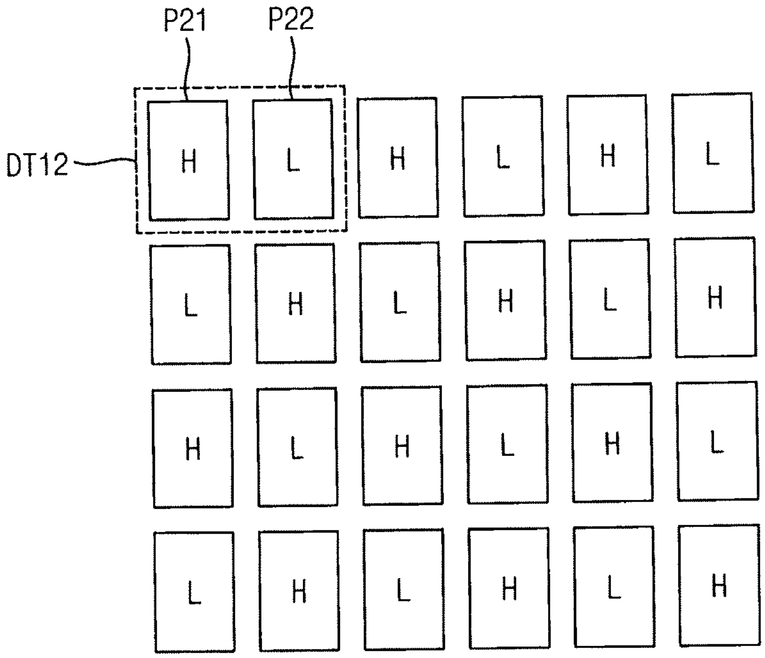

For example, as illustrated in FIG. 11B, a dot DT12 may include a first non-boundary pixel P21 and a second non-boundary pixel P22. The first non-boundary pixel P21 may operate based on the first gamma curve (e.g., GH in FIG. 5). The second non-boundary pixel P22 may be adjacent to the first non-boundary pixel P21 in the row direction and may operate based on the second gamma curve (e.g., GL in FIG. 5). In the example of FIG. 11B, the first and second non-boundary pixels P21 and P22 may be disposed in the same row.

In an exemplary embodiment of the present inventive concept, each of the plurality of dots may include three non-boundary pixels. A ratio of the number of non-boundary pixels operating based on the first gamma curve (e.g., GH in FIG. 5) and the number of non-boundary pixels operating based on the second gamma curve (e.g., GL in FIG. 5) may be about 1:2. The non-boundary pixels operating based on the first gamma curve and the non-boundary pixels operating based on the second gamma curve may be alternately disposed (e.g., disposed in an order of H, L, L, H, L, L, . . . ) in a row direction and/or a column direction.

Figure 12A:
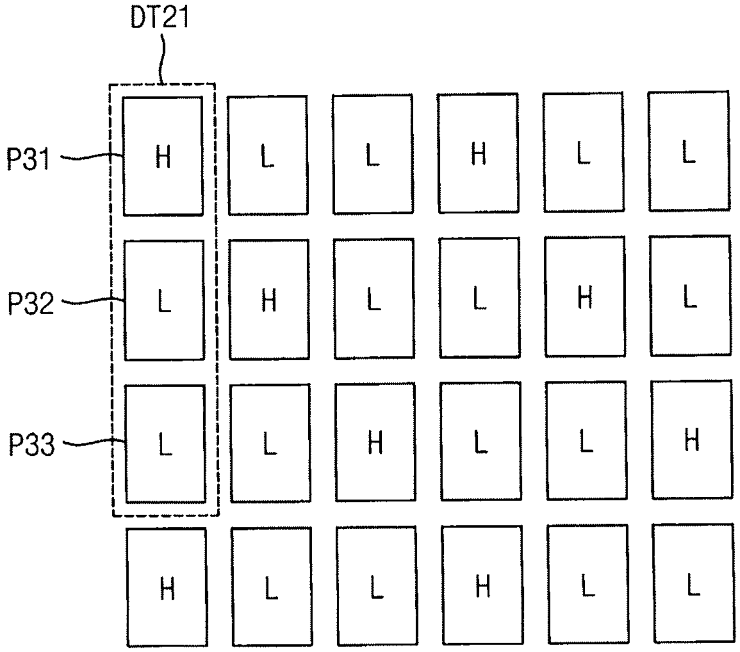

For example, as illustrated in FIG. 12A, a dot DT21 may include a first non-boundary pixel P31, a second non-boundary pixel P32 and a third non-boundary pixel P33. The first non-boundary pixel P31 may operate based on the first gamma curve (e.g., GH in FIG. 5). The second non-boundary pixel P32 may be adjacent to the first non-boundary pixel P31 in the column direction and may operate based on the second gamma curve (e.g., GL in FIG. 5). The third non-boundary pixel P33 may be adjacent to the second non-boundary pixel P32 in the column direction and may operate based on the second gamma curve (e.g., GL in FIG. 5). In the example of FIG. 12A, the first, second and third non-boundary pixels P31, P32 and P33 may be disposed in the same column.

Figure 12B:
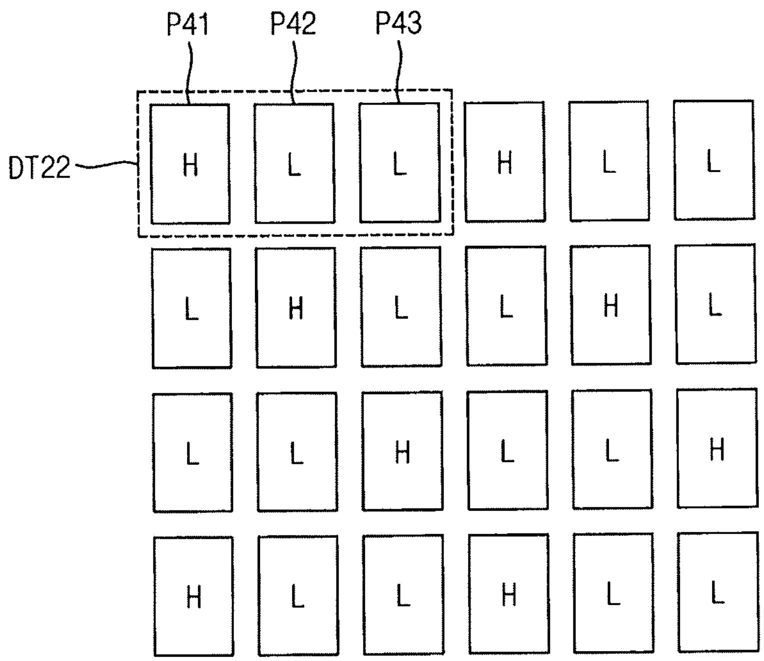

For example, as illustrated in FIG. 12B, a dot DT22 may include a first non-boundary pixel P41, a second non-boundary pixel P42 and a third non-boundary pixel P43. The first non-boundary pixel P41 may operate based on the first gamma curve (e.g., GH in FIG. 5). The second non-boundary pixel P42 may be adjacent to the first non-boundary pixel P41 in the row direction and may operate based on the second gamma curve (e.g., GL in FIG. 5). The third non-boundary pixel P43 may be adjacent to the second non-boundary pixel P42 in the row direction and may operate based on the second gamma curve (e.g., GL in FIG. 5). In the example of FIG. 12B, the first, second and third non-boundary pixels P41, P42 and P43 may be disposed in the same row.

Figure 12C:
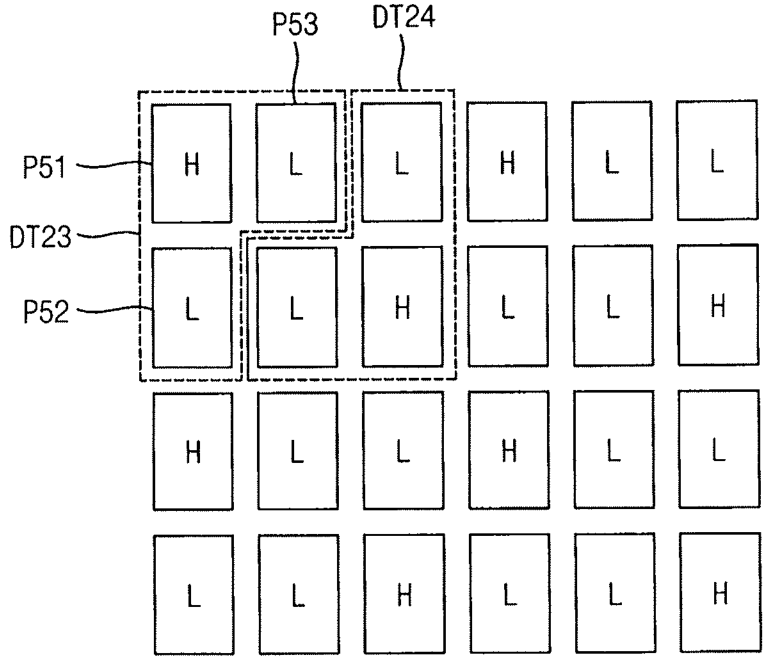

For example, as illustrated in FIG. 12C, a dot DT23 may include a first non-boundary pixel P51, a second non-boundary pixel P52 and a third non-boundary pixel P53. The first non-boundary pixel P51 may operate based on the first gamma curve (e.g., GH in FIG. 5). The second non-boundary pixel P52 may be adjacent to the first non-boundary pixel P51 in the column direction and may operate based on the second gamma curve (e.g., GL in FIG. 5). The third non-boundary pixel P53 may be adjacent to the first non-boundary pixel P51 in the row direction and may operate based on the second gamma curve (e.g., GL in FIG. 5). In the example of FIG. 12C, another dot DT24 adjacent to the dot DT23 may also include three non-boundary pixels. A shape and an image arrangement of the dot DT24 may be different from a shape and an image arrangement of the dot DT23.

As described above with reference to FIGS. 12A, 12B and 12C, when one dot includes three non-boundary pixels, the third non-boundary pixel (e.g., P33, P43 and P53) may be adjacent to one of the first non-boundary pixel (e.g., P31, P41 and P51) and the second non-boundary pixel (e.g., P32, P42 and P52), and the third non-boundary pixel (e.g., P33, P43 and P53) and at least one of the first and second non-boundary pixels (e.g., P31, P32, P41, P42, P51 and P52) may be disposed in the same row or the same column.

In an exemplary embodiment of the present inventive concept, each of the plurality of dots may include four non-boundary pixels. A ratio of the number of non-boundary pixels operating based on the first gamma curve (e.g., GH in FIG. 5) and the number of non-boundary pixels operating based on the second gamma curve (e.g., GL in FIG. 5) may be about 1:3. The non-boundary pixels operating based on the first gamma curve and the non-boundary pixels operating based on the second gamma curve may be alternately disposed (e.g., disposed in an order of H, L, L, L, H, L, L, L, . . . ) in a row direction and/or a column direction.

Figure 13A:
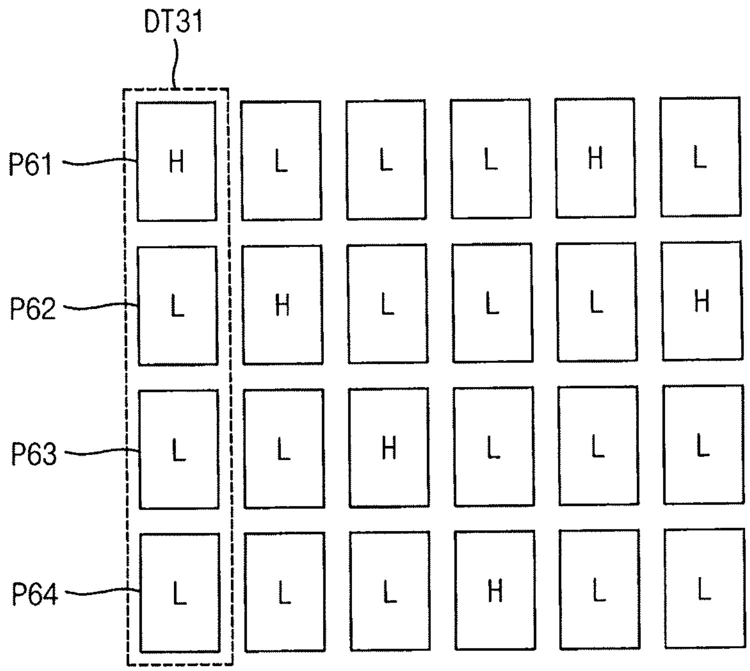

For example, as illustrated in FIG. 13A, a dot DT31 may include a first non-boundary pixel P61, a second non-boundary pixel P62, a third non-boundary pixel P63 and a fourth non-boundary pixel P64. The first non-boundary pixel P61 may operate based on the first gamma curve (e.g., GH in FIG. 5). The second non-boundary pixel P62 may be adjacent to the first non-boundary pixel P61 in the column direction. The third non-boundary pixel P63 may be adjacent to the second non-boundary pixel P62 in the column direction. The fourth non-boundary pixel P64 may be adjacent to the third non-boundary pixel P63 in the column direction. The second, third and fourth non-boundary pixels P62, P63 and P64 may operate based on the second gamma curve (e.g., GL in FIG. 5). In the example of FIG. 13A, the first, second, third and fourth non-boundary pixels P61, P62, P63 and P64 may be disposed in the same column.

Figure 13B:
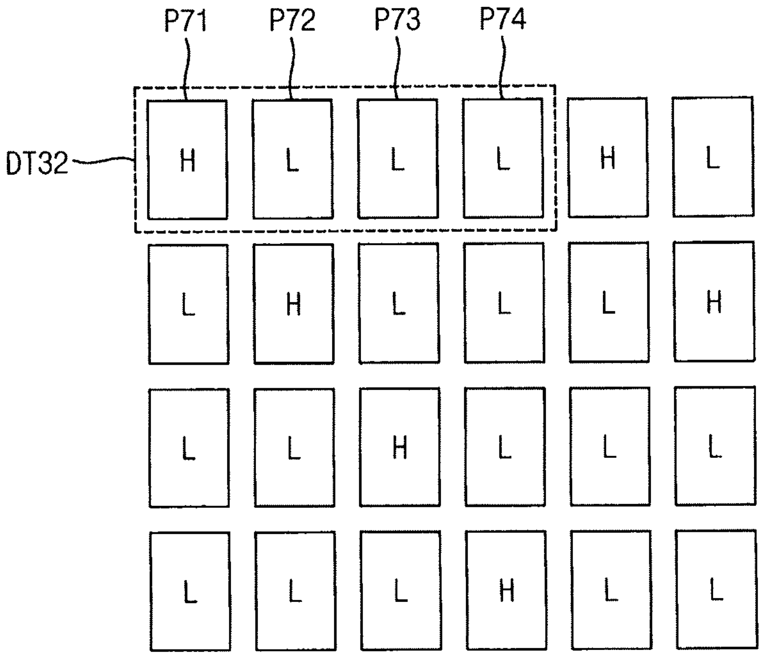

For example, as illustrated in FIG. 13B, a dot DT32 may include a first non-boundary pixel P71, a second non-boundary pixel P72, a third non-boundary pixel P73 and a fourth non-boundary pixel P74. The first non-boundary pixel P71 may operate based on the first gamma curve (e.g., GH in FIG. 5). The second non-boundary pixel P72 may be adjacent to the first non-boundary pixel P71 in the row direction. The third non-boundary pixel P73 may be adjacent to the second non-boundary pixel P72 in the row direction. The fourth non-boundary pixel P74 may be adjacent to the third non-boundary pixel P73 in the row direction. The second, third and fourth non-boundary pixels P72, P73 and P74 may operate based on the second gamma curve (e.g., GL in FIG. 5). In the example of FIG. 13B, the first, second, third and fourth non-boundary pixels P71, P72, P73 and P74 may be disposed in the same row.

Figure 13C:
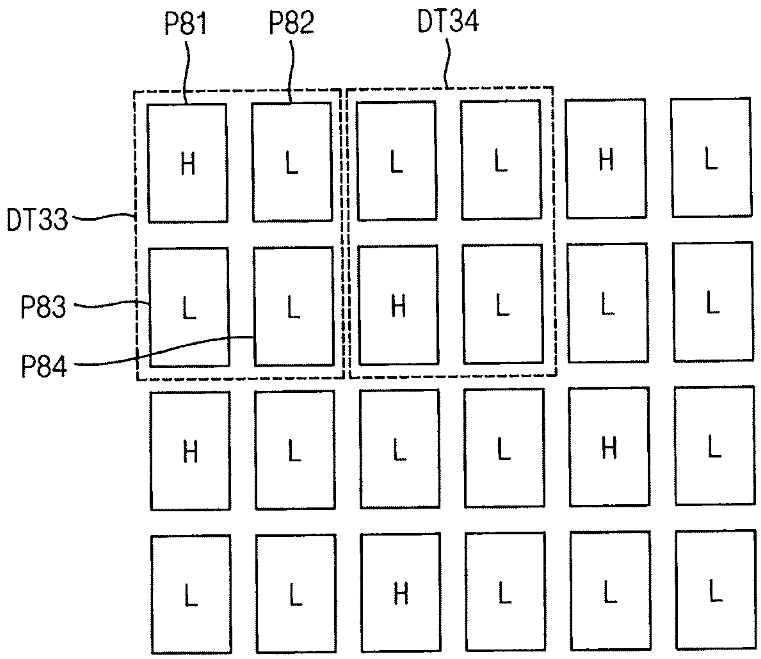

For example, as illustrated in FIG. 13C, a dot DT33 may include a first non-boundary pixel P81, a second non-boundary pixel P82, a third non-boundary pixel P83 and a fourth non-boundary pixel P84. The first non-boundary pixel P81 may operate based on the first gamma curve (e.g., GH in FIG. 5). The second non-boundary pixel P82 may be adjacent to the first non-boundary pixel P81 in the row direction. The third non-boundary pixel P83 may be adjacent to the first non-boundary pixel P81 in the column direction. The fourth non-boundary pixel P84 may be adjacent to the second and third non-boundary pixels P82 and P83. The second, third and fourth non-boundary pixels P82, P83 and P84 may operate based on the second gamma curve (e.g., GL in FIG. 5). The first, second, third and fourth non-boundary pixels P81, P82, P83 and P84 may have a 2*2 matrix form. In the example of FIG. 13C, another dot DT34 adjacent to the dot DT33 may also include four non-boundary pixels. An image arrangement of the dot DT34 may be different from an image arrangement of the dot DT33.

As described above with reference to FIGS. 13A, 13B and 13C, when one dot includes four non-boundary pixels, the fourth non-boundary pixel (e.g., P64, P74 and P84) may be adjacent to at least one of the first non-boundary pixel (e.g., P61, P71 and P81), the second non-boundary pixel (e.g., P62, P72 and P82) and the third non-boundary pixel (e.g., P63, P73 and P83), and the fourth non-boundary pixel (e.g., P64, P74 and P84) and at least one of the first, second and third non-boundary pixels (e.g., P61, P62, P63, P71, P72, P73, P81, P82 and P83) may be disposed in the same row or the same column.

Although the examples of the SGM scheme are described based on the dot including two non-boundary pixels (e.g., the examples of FIGS. 11A and 11B), the dot including three non-boundary pixels (e.g., the examples of FIGS. 12A, 12B and 12C) and the dot including four non-boundary pixels (e.g., the examples of FIGS. 13A, 13B and 13C), the number of non-boundary pixels in one dot may not be limited thereto. For example, a dot may include more than four non-boundary pixels.

Figure 14A:
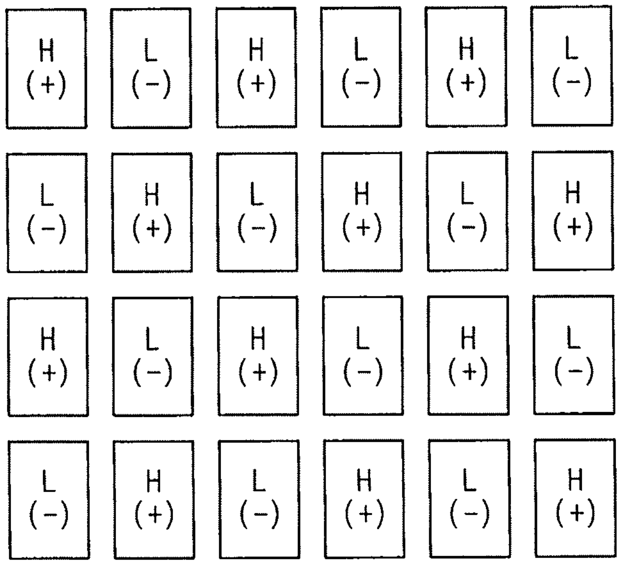
FIGS. 14A, 14B, 15A and 15B are diagrams for describing an operation of the display apparatus of FIG. 1 according to exemplary embodiments of the present inventive concept.
Figure 14B:
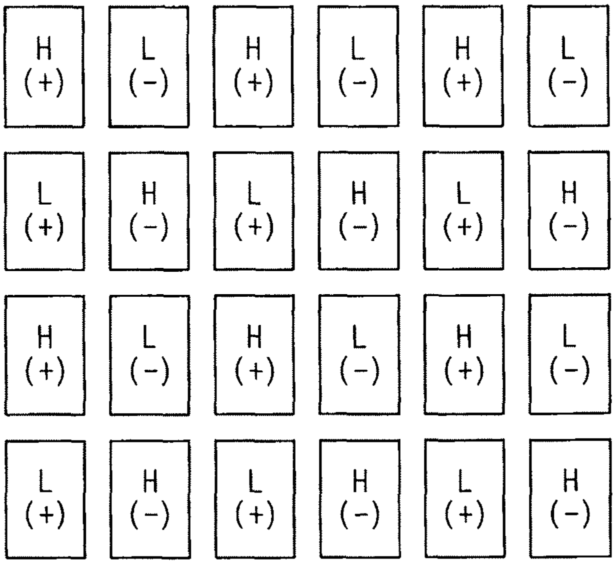
Figure 15A:
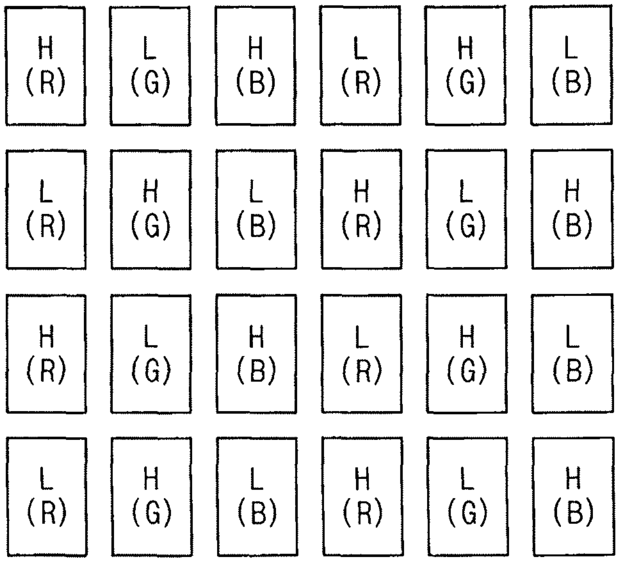
Figure 15B:
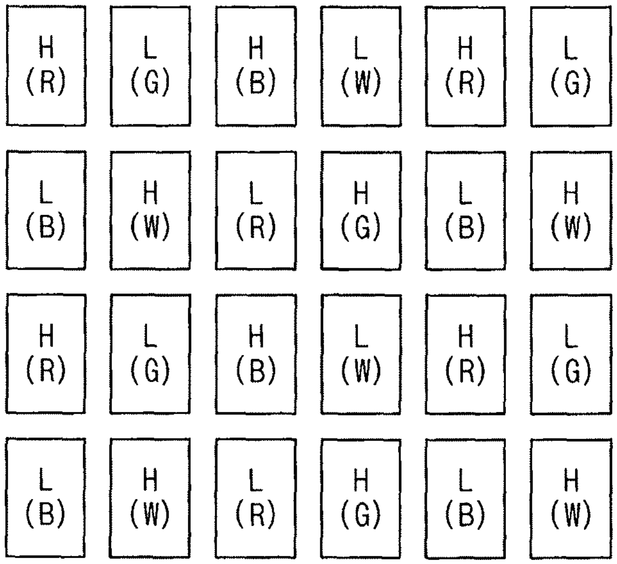

FIGS. 14A, 14B, 15A and 15B are diagrams for describing an operation of the display apparatus 10 according to exemplary embodiments of the present inventive concept. FIGS. 14A and 14B illustrate examples of an inversion driving scheme in the display apparatus 10. FIGS. 15A and 15B illustrate examples of a pixel arrangement in the display apparatus 10.

Referring to FIGS. 1, 14A and 14B, the display panel 100 may operate based on the inversion driving scheme in which a polarity of a data voltage applied to each pixel is reversed with respect to the common voltage at every predetermined period (e.g., at every frame). A characteristic of the liquid crystal in the display panel 100 might not degrade due to the inversion driving scheme.

In an exemplary embodiment of the present inventive concept, the display panel 100 may have a polarity pattern of a dot inversion where a single pixel is surrounded by pixels having a polarity, which is opposite to that of the single pixel. For example, as illustrated in FIG. 14A, during a first frame, each of first and third pixel rows may have a polarity pattern of "+, −, +, −, +, −", and each of second and fourth pixel rows may have a polarity pattern of "−, +, −, +, −, +". During a second frame subsequent to the first frame, each of the first and third pixel rows may have the polarity pattern of "−, +, −, +, −, +", and each of the second and fourth pixel rows may have the polarity pattern of "+, −, +, −, +, −". In other words, the polarity patterns of the pixel rows are reversed in the second frame.

In an exemplary embodiment of the inventive concept, the display panel 100 may have a polarity pattern of a line inversion (e.g., a column inversion or a row inversion) where pixels in a single column or a single row have the same polarity as each other. For example, as illustrated in FIG. 14B, during a first frame, each of first, third and fifth pixel columns may have a polarity pattern of "+, +, +, +", and each of second, fourth and sixth pixel columns may have a polarity pattern of "−, −, −, −". During a second frame subsequent to the first frame, each of the first, third and fifth pixel columns may have the polarity pattern of "−, −, −, −", and each of the second, fourth and sixth pixel columns may have the polarity pattern of "+, +, +, +". In other words, the polarity patterns of the pixel columns are reversed in the second frame.

In addition to that illustrated in FIGS. 14A and 14B, the display panel 100 may have a polarity pattern of a dot inversion where two, three or six subpixels have the same polarity with each other and are surrounded by subpixels having the opposite polarity. Further, the display panel 100 may have a polarity pattern of a line inversion where pixels in two or three adjacent pixel rows or columns have the same polarity as each other.

Referring to FIGS. 1, 15A and 15B, the display panel 100 may include the plurality of pixels that output lights having various colors. For example, as illustrated in FIG. 15A, the display panel 100 may include a red pixel R for outputting red light, a green pixel G for outputting green light and a blue pixel B for outputting blue light. For example, as illustrated in FIG. 15B, the display panel 100 may include a red pixel R for outputting red light, a green pixel G for outputting green light, a blue pixel B for outputting blue light and a white pixel W for outputting white light. An arrangement of the color pixels may not be limited thereto.

Figure 16:
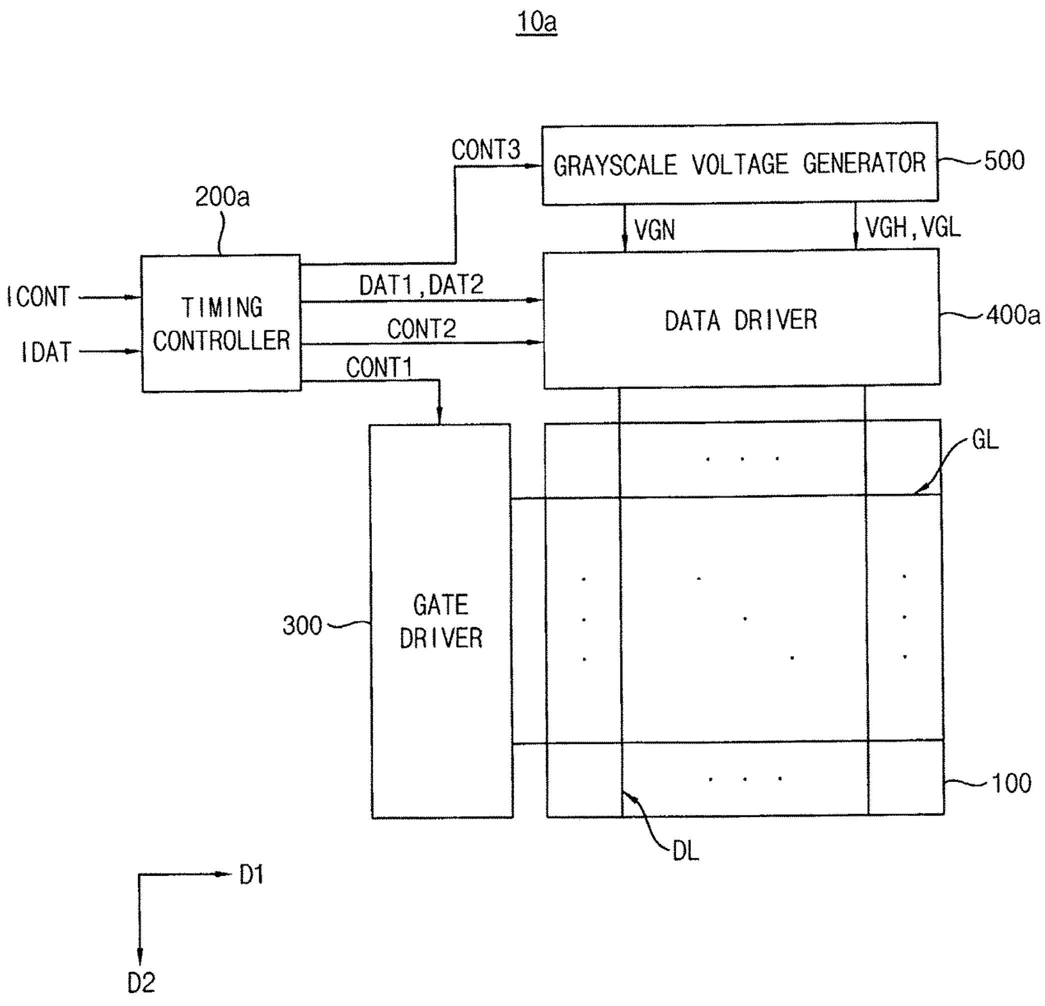
FIG. 16 is a block diagram illustrating a display apparatus according to an exemplary embodiment of the present inventive concept.

FIG. 16 is a block diagram illustrating a display apparatus according to an exemplary embodiment of the present inventive concept.

Referring to FIG. 16, a display apparatus 10*a* includes a display panel 100, a timing controller 200*a*, a gate driver 300 and a data driver 400*a*. The display apparatus 10*a* may further include a grayscale voltage generator 500.

The display apparatus 10*a* of FIG. 16 may be substantially the same as the display apparatus 10 of FIG. 1, except that the display apparatus 10*a* of FIG. 16 further includes the grayscale voltage generator 500. In addition, the timing controller 200*a* and the data driver 400*a* in FIG. 16 are partially different from the timing controller 200 and the data driver 400 in FIG. 1, respectively.

The display panel 100 is connected to a plurality of gate lines GL and a plurality of data lines DL and displays an image based on output image data DAT1 and DAT2. The display panel 100 in FIG. 16 may be substantially the same as the display panel 100 in FIG. 1.

The timing controller 200*a* controls an operation of the display panel 100 and controls operations of the gate driver 300, the data driver 400*a* and the grayscale voltage generator 500. The timing controller 200*a* generates the output image data DAT1 and DAT2, a first control signal CONT1, a second control signal CONT2 and a third control signal CONT3 based on input image data IDAT and an input control signal ICONT.

The gate driver 300 generates a plurality of gate signals based on the first control signal CONT1 to apply the gate signals to the gate lines GL. The gate driver 300 in FIG. 16 may be substantially the same as the gate driver 300 in FIG. 1.

The grayscale voltage generator 500 receives the third control signal CONT3 from the timing controller 200*a*. The grayscale voltage generator 500 generates a first reference grayscale voltage VGN corresponding to a reference gamma curve (e.g., GN in FIG. 5), a second reference grayscale voltage VGH corresponding to a first gamma curve (e.g., GH in FIG. 5) and a third reference grayscale voltage VGL corresponding to a second gamma curve (e.g., GL in FIG. 5) based on the third control signal CONT3. The grayscale voltage generator 500 provides the first, second and third reference grayscale voltages VGN, VGH and VGL to the data driver 400*a*.

In an exemplary embodiment of the present inventive concept, the grayscale voltage generator 500 may include a resistor string circuit and generate analog reference grayscale voltages VGN, VGH and VGL based on a power supply voltage and a ground voltage. In addition, the grayscale voltage generator 500 may generate digital reference grayscale voltages VGN, VGH and VGL.

The data driver 400*a* generates a plurality of analog data voltages based on the second control signal CONT2, the first, second and third reference grayscale voltages VGN, VGH and VGL and the digital output image data DAT1 and DAT2 to apply the data voltages to the data lines DL. For example, the data driver 400*a* may generate first data voltages to be applied to boundary pixels (e.g., BP in FIG. 4) based on the first reference grayscale voltage VGN and a portion of the output image data (e.g., DAT1). The data driver 400*a* may generate second data voltages to be applied to non-boundary pixels (e.g., NBP1 and NBP2 in FIG. 4) based on the second and third reference grayscale voltages VGH and VGL and another portion of the output image data (e.g., DAT2).

Figure 17:
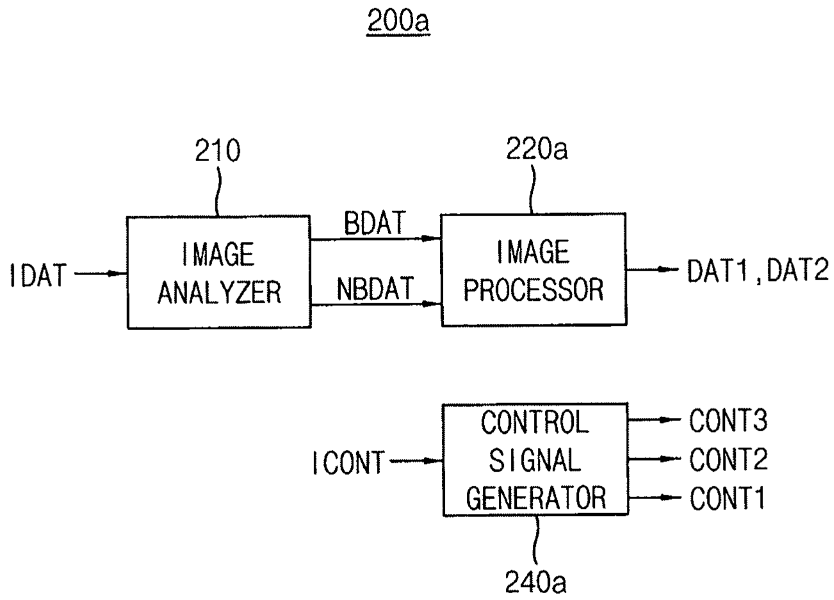
FIG. 17 is a block diagram illustrating a timing controller included in the display apparatus of FIG. 16 according to an exemplary embodiment of the present inventive concept.

FIG. 17 is a block diagram illustrating the timing controller 200*a* included in the display apparatus 10*a* according to an exemplary embodiment of the present inventive concept.

Referring to FIGS. 16 and 17, the timing controller 200*a* generates first image data BDAT and second image data NBDAT by analyzing the input image data IDAT and generates the output image data DAT1 and DAT2 based on the first and second image data BDAT and NBDAT. The display panel 100 displays a first image (e.g., IMG1 in FIG. 3) based on the output image data DAT1 and DAT2. The boundary pixels (e.g., BP in FIG. 4) corresponding to a boundary region in the first image operate based on the first reference grayscale voltage VGN corresponding to the reference gamma curve (e.g., GN in FIG. 5). The non-boundary pixels (e.g., NBP1 and NBP2 in FIG. 4) corresponding to a non-boundary region in the first image operate based on the second reference grayscale voltage VGH corresponding to the first gamma curve (e.g., GH in FIG. 5) and the third reference grayscale voltage VGL corresponding to the second gamma curve (e.g., GL in FIG. 5).

The timing controller 200*a* may include an image analyzer 210, an image processor 220*a* and a control signal generator 240*a*.

The image analyzer 210 may analyze the input image data IDAT to extract high frequency components and low frequency components from the input image data IDAT. The image analyzer 210 may determine a region corresponding to the high frequency components as the boundary region and may determine a region corresponding to the low frequency components as the non-boundary region. The image analyzer 210 may generate the first image data BDAT including the high frequency components and the second image data NBDAT including the low frequency components. The image analyzer 210 in FIG. 17 may be substantially the same as the image analyzer 210 in FIG. 2.

The image processor 220*a* may generate a first portion DAT1 of the output image data corresponding to the first image data BDAT and may generate a second portion DAT2 of the output image data corresponding to the second image data NBDAT. In addition, the image processor 220*a* may selectively perform an image quality compensation, a spot compensation, an ACC and/or a DCC on the first and second image data BDAT and NBDAT to generate the output image data DAT1 and DAT2.

The control signal generator 240*a* may generate the first control signal CONT1 for the gate driver 300, the second control signal CONT2 for the data driver 400*a* and the third control signal CONT3 for the grayscale voltage generator 500 based on the input control signal ICONT. The control signal generator 240*a* may output the first control signal CONT1 to the gate driver 300, may output the second control signal CONT2 to the data driver 400*a* and may output the third control signal CONT3 to the grayscale voltage generator 500.

Figure 18:
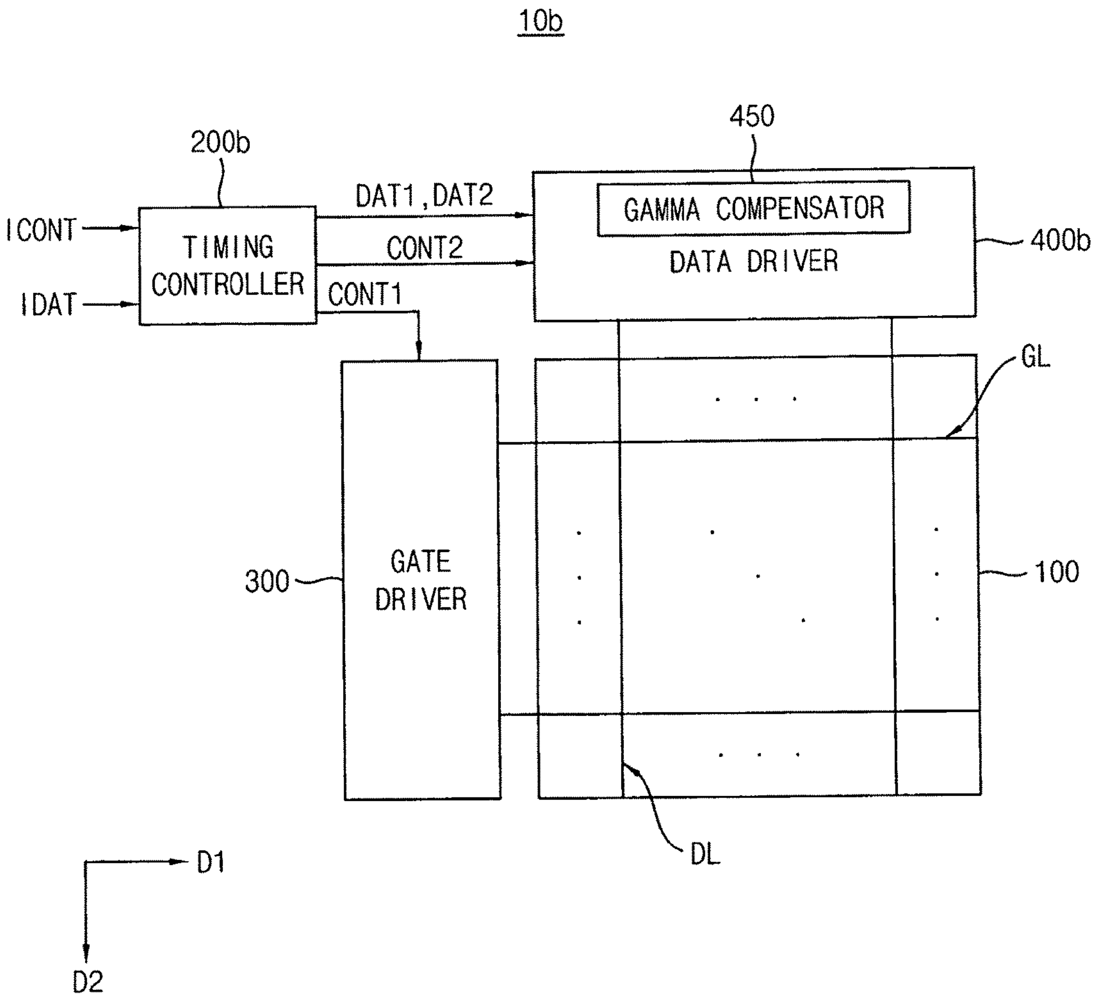
FIG. 18 is a block diagram illustrating a display apparatus according to an exemplary embodiment of the present inventive concept.

FIG. 18 is a block diagram illustrating a display apparatus according to an exemplary embodiment of the present inventive concept.

Referring to FIG. 18, a display apparatus 10*b* includes a display panel 100, a timing controller 200*b*, a gate driver 300 and a data driver 400*b*.

The display apparatus 10*b* of FIG. 18 may be substantially the same as the display apparatus 10*a* of FIG. 16, except that a gamma compensator 450 corresponding to the grayscale voltage generator 500 of FIG. 16 is disposed in the data driver 400*b*. In addition, the timing controller 200*b* and the data driver 400*b* in FIG. 18 are partially different from the timing controller 200*a* and the data driver 400*a* in FIG. 16, respectively. The display panel 100 and the gate driver 300 in FIG. 18 may be substantially the same as the display panel 100 and the gate driver 300 in FIG. 16, respectively.

The timing controller 200*b* controls an operation of the display panel 100 and controls operations of the gate driver 300 and the data driver 400*b*. The timing controller 200*b* generates output image data DAT1 and DAT2, a first control signal CONT1 and a second control signal CONT2 based on input image data IDAT and an input control signal ICONT.

The data driver 400*b* may include the gamma compensator 450. The gamma compensator 450 may generate reference gamma data or a first reference grayscale voltage corresponding to a reference gamma curve (e.g., GN in FIG. 5), may generate first gamma data or a second reference grayscale voltage corresponding to a first gamma curve (e.g., GH in FIG. 5), and may generate second gamma data or a third reference grayscale voltage corresponding to a second gamma curve (e.g., GL in FIG. 5).

The data driver 400*b* generates a plurality of analog data voltages based on the second control signal CONT2, the digital image data DAT1 and DAT2 and outputs of the gamma compensator 450 to apply the data voltages to the data lines DL. For example, the data driver 400*b* may generate first data voltages to be applied to boundary pixels (e.g., BP in FIG. 4) based on one of the reference gamma data and the first reference grayscale voltage and a portion of the output image data (e.g., DAT1). The data driver 400*b* may generate second data voltages to be applied to non-boundary pixels (e.g., NBP1 and NBP2 in FIG. 4) based on one of the first gamma data and the second reference grayscale voltage, one of the second gamma data and the third reference grayscale voltage and another portion of the output image data (e.g., DAT2).

Figure 19:
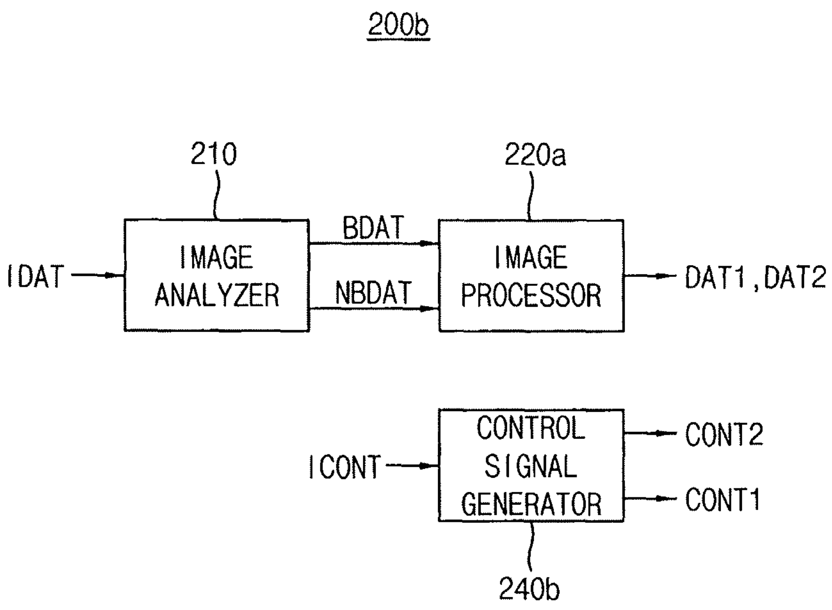
FIG. 19 is a block diagram illustrating a timing controller included in the display apparatus of FIG. 18 according to an exemplary embodiment of the present inventive concept.

FIG. 19 is a block diagram illustrating the timing controller 200*b* included in the display apparatus 10*b* according to an exemplary embodiment of the present inventive concept.

Referring to FIGS. 18 and 19, the timing controller 200*b* generates first image data BDAT and second image data NBDAT by analyzing the input image data IDAT and generates the output image data DAT1 and DAT2 based on the first and second image data BDAT and NBDAT. The display panel 100 displays a first image (e.g., IMG1 in FIG. 3) based on the output image data DAT1 and DAT2. The boundary pixels (e.g., BP in FIG. 4) corresponding to a boundary region in the first image operate based on the reference gamma curve (e.g., GN in FIG. 5). The non-boundary pixels (e.g., NBP1 and NBP2 in FIG. 4) corresponding to a non-boundary region in the first image operate based on the first gamma curve (e.g., GH in FIG. 5) and the second gamma curve (e.g., GL in FIG. 5).

The timing controller 200*b* may include an image analyzer 210, an image processor 220*a* and a control signal generator 240*b*. The image analyzer 210 and the image processor 220*a* in FIG. 19 may be substantially the same as the image analyzer 210 and the image processor 220*a* in FIG. 17, respectively.

The control signal generator 240*b* may generate the first control signal CONT1 for the gate driver 300 and the second control signal CONT2 for the data driver 400*b* based on the input control signal ICONT. The control signal generator 240*a* may output the first control signal CONT1 to the gate driver 300 and may output the second control signal CONT2 to the data driver 400*b*.

Figure 20:
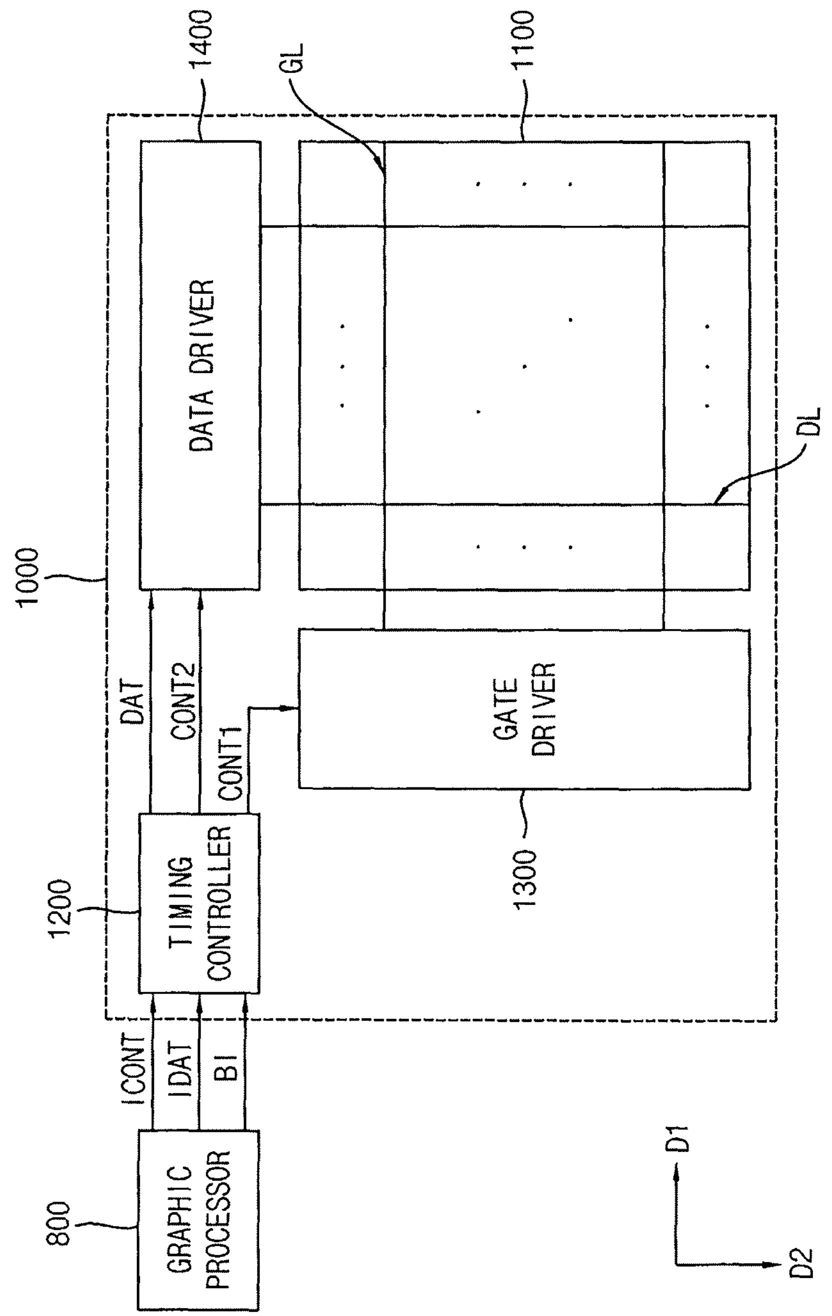
FIG. 20 is a block diagram illustrating a display apparatus according to an exemplary embodiment of the present inventive concept.

FIG. 20 is a block diagram illustrating a display apparatus according to an exemplary embodiment of the present inventive concept.

Referring to FIG. 20, a display apparatus 1000 receives input image data IDAT, boundary data BI and an input control signal ICONT from an external graphic processor 800. The boundary data BI includes information of a boundary region in a first image (e.g., IMG1 in FIG. 3) and information of a non-boundary region other than the boundary region in the first image. For example, the graphic processor 800 may analyze the input image data IDAT to extract high frequency components and low frequency components from the input image data IDAT, may determine a region corresponding to the high frequency components as the boundary region, may determine a region corresponding to the low frequency components as the non-boundary region, and may generate the boundary data BI including the information of the boundary region and the non-boundary region.

The display apparatus 1000 includes a display panel 1100, a timing controller 1200, a gate driver 1300 and a data driver 1400.

The display apparatus 1000 of FIG. 20 may be substantially the same as the display apparatus 10 of FIG. 1, except that the boundary data BI is received from the external graphic processor 800. In addition, the timing controller 1200 in FIG. 20 is partially different from the timing controller 200 in FIG. 1. The display panel 1100, the gate driver 1300 and the data driver 1400 in FIG. 20 may be substantially the same as the display panel 100, the gate driver 300 and the data driver 400 in FIG. 1, respectively.

The timing controller 1200 controls an operation of the display panel 1100 and controls operations of the gate driver 1300 and the data driver 1400. The timing controller 1200 generates output image data DAT, a first control signal CONT1 and a second control signal CONT2 based on the input image data IDAT, the boundary data BI and the input control signal ICONT.

Figure 21:
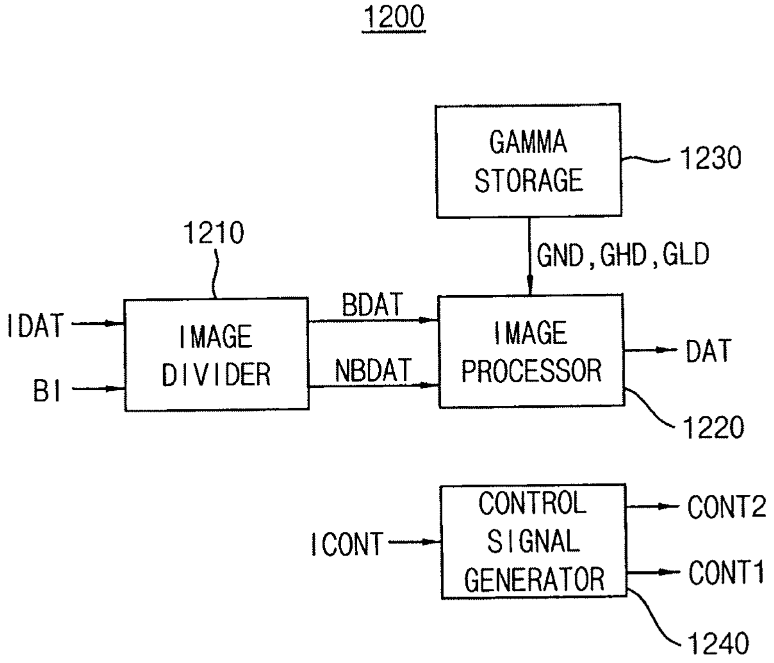
FIG. 21 is a block diagram illustrating a timing controller included in the display apparatus of FIG. 20 according to an exemplary embodiment of the present inventive concept.

FIG. 21 is a block diagram illustrating a timing controller included in the display apparatus according to an exemplary embodiment of the present inventive concept.

Referring to FIGS. 20 and 21, the timing controller 1200 generates first image data BDAT and second image data NBDAT based on the input image data IDAT and the boundary data BI and generates the output image data DAT based on the first and second image data BDAT and NBDAT. The display panel 1100 displays a first image (e.g., IMG1 in FIG. 3) based on the output image data DAT. Boundary pixels (e.g., BP in FIG. 4) corresponding to a boundary region in the first image operate based on reference gamma data GND associated with a reference gamma curve (e.g., GN in FIG. 5). Non-boundary pixels (e.g., NBP1 and NBP2 in FIG. 4) corresponding to a non-boundary region in the first image operate based on first gamma data GHD associated with a first gamma curve (e.g., GH in FIG. 5) and second gamma data GLD associated with a second gamma curve (e.g., GL in FIG. 5).

The timing controller 1200 may include an image divider 1210, an image processor 1220, a gamma storage 1230 and a control signal generator 1240.

The image divider 1210 may divide the input image data IDAT into the first image data BDAT corresponding to the boundary region and the second image data NBDAT corresponding to the non-boundary region based on the boundary data BI.

The gamma storage 1230 may store the reference gamma data GND, the first gamma data GHD and the second gamma data GLD. The image processor 1220 may generate the output image data DAT based on the first and second image data BDAT and NBDAT. The control signal generator 1240 may generate the first control signal CONT1 and the second control signal CONT2 based on the input control signal ICONT. The image processor 1220, the gamma storage 1230 and the control signal generator 1240 in FIG. 21 may be substantially the same as the image processor 220, the gamma storage 230 and the control signal generator 240 in FIG. 2, respectively.

Figure 22:
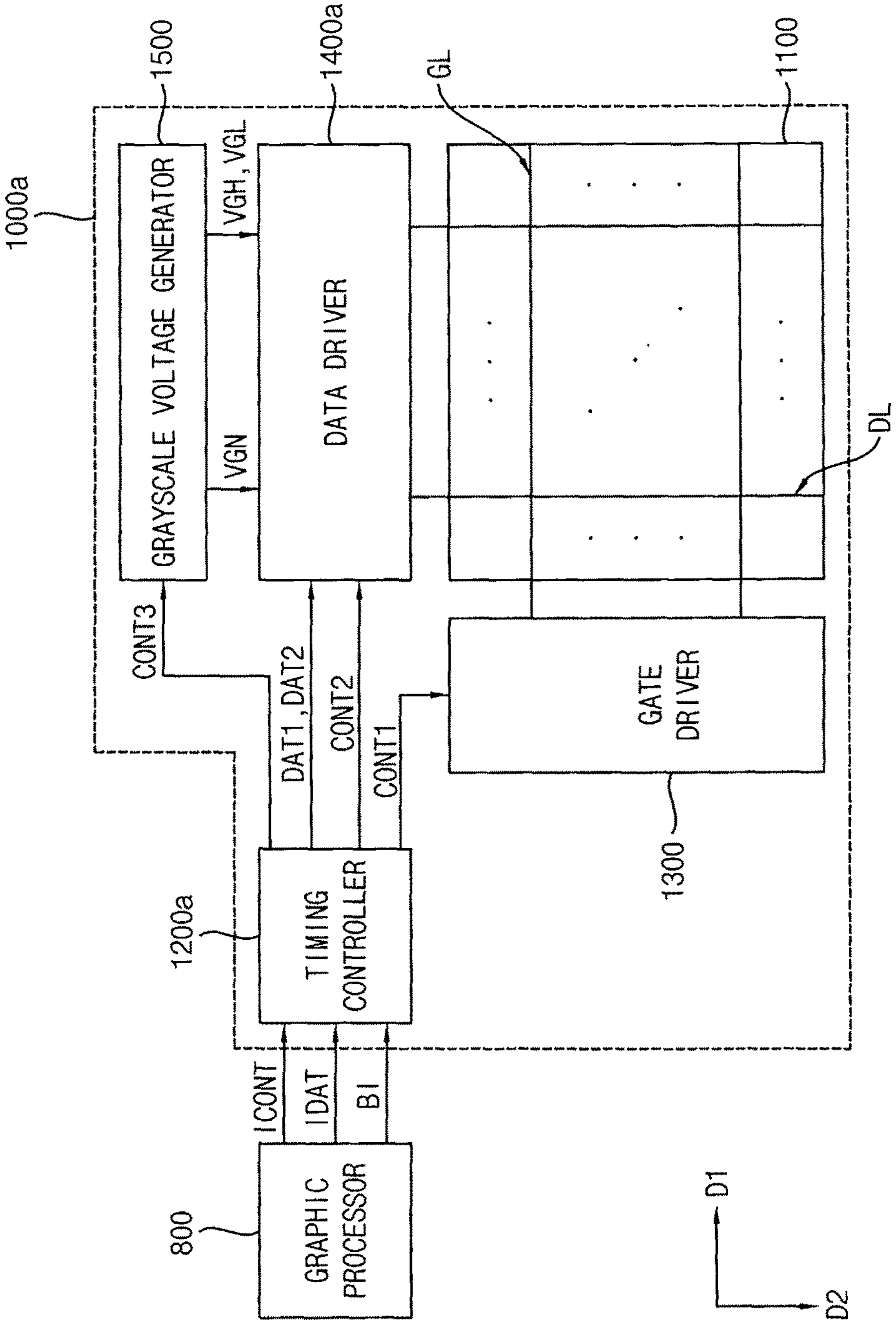
FIG. 22 is a block diagram illustrating a display apparatus according to an exemplary embodiment of the present inventive concept.

FIG. 22 is a block diagram illustrating a display apparatus according to an exemplary embodiment of the present inventive concept.

Referring to FIG. 22, a display apparatus 1000*a* receives input image data IDAT, boundary data BI and an input control signal ICONT from an external graphic processor 800. The graphic processor 800 in FIG. 22 may be substantially the same as the graphic processor 800 in FIG. 20.

The display apparatus 1000*a* includes a display panel 1100, a timing controller 1200*a*, a gate driver 1300 and a data driver 1400*a*. The display apparatus 1000*a* may further include a grayscale voltage generator 1500.

The display apparatus 1000*a* of FIG. 22 may be substantially the same as the display apparatus 10*a* of FIG. 16, except that the boundary data BI is received from the external graphic processor 800. In addition, the timing controller 1200*a* in FIG. 22 is partially different from the timing controller 200*a* in FIG. 16. The display panel 1100, the gate driver 1300, the data driver 1400*a* and the grayscale voltage generator 1500 in FIG. 22 may be substantially the same as the display panel 100, the gate driver 300, the data driver 400*a* and the grayscale voltage generator 500 in FIG. 16, respectively.

The timing controller 1200*a* controls an operation of the display panel 1100 and controls operations of the gate driver 1300, the data driver 1400*a* and the grayscale voltage generator 1500. The timing controller 1200*a* generates output image data DAT1 and DAT2, a first control signal CONT1, a second control signal CONT2 and a third control signal CONT3 based on the input image data IDAT, the boundary data BI and the input control signal ICONT.

Figure 23:
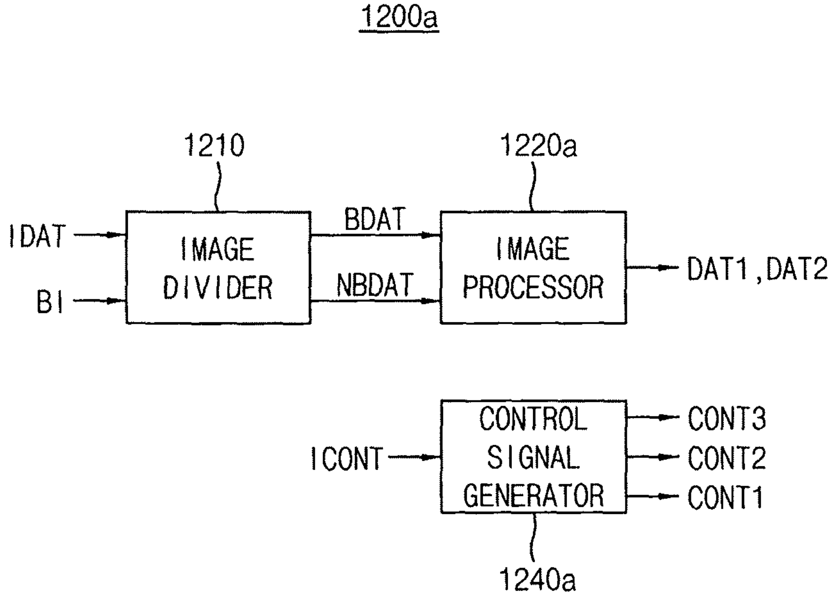
FIG. 23 is a block diagram illustrating a timing controller included in the display apparatus of FIG. 22 according to an exemplary embodiment of the present inventive concept.

FIG. 23 is a block diagram illustrating the timing controller 1200*a* included in the display apparatus 1200*a* according to an exemplary embodiment of the present inventive concept.

Referring to FIGS. 22 and 23, the timing controller 1200*a* generates first image data BDAT and second image data NBDAT based on the input image data IDAT and the boundary data BI and generates the output image data DAT1 and DAT2 based on the first and second image data BDAT and NBDAT. The display panel 1100 displays a first image (e.g., IMG1 in FIG. 3) based on the output image data DAT1 and DAT2. Boundary pixels (e.g., BP in FIG. 4) corresponding to a boundary region in the first image operate based on a first reference grayscale voltage VGN corresponding to a reference gamma curve (e.g., GN in FIG. 5). Non-boundary pixels (e.g., NBP1 and NBP2 in FIG. 4) corresponding to a non-boundary region in the first image operate based on a second reference grayscale voltage VGH corresponding to a first gamma curve (e.g., GH in FIG. 5) and a third reference grayscale voltage VGL corresponding a second gamma curve (e.g., GL in FIG. 5).

The timing controller 1200*a* may include an image divider 1210, an image processor 1220*a* and a control signal generator 1240*a*. The image divider 1210 in FIG. 23 may be substantially the same as the image divider 1210 in FIG. 21. The image processor 1220*a* and the control signal generator 1240*a* in FIG. 23 may be substantially the same as the image processor 220*a* and the control signal generator 240*a* in FIG. 17, respectively.

Figure 24:
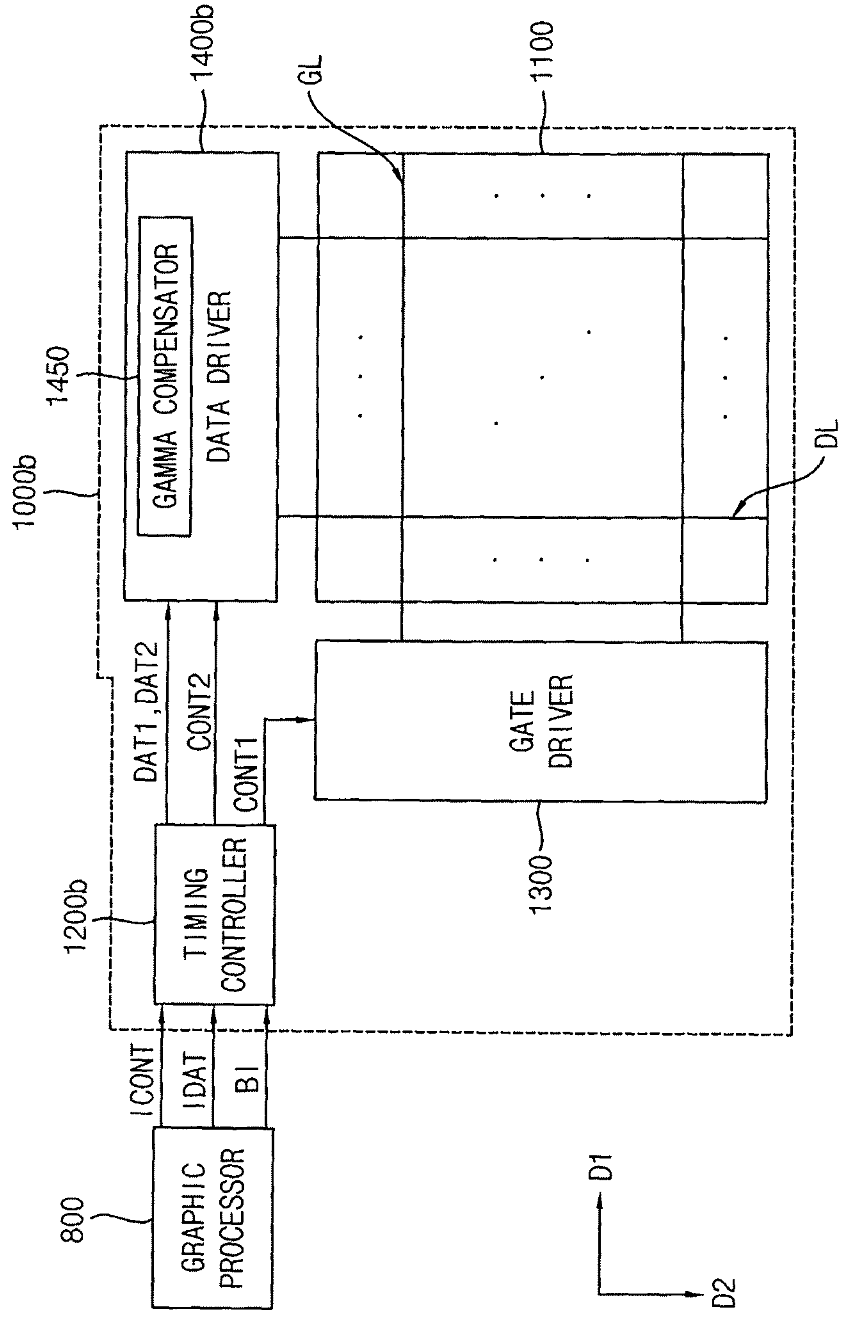
FIG. 24 is a block diagram illustrating a display apparatus according to an exemplary embodiment of the present inventive concept.

FIG. 24 is a block diagram illustrating a display apparatus according to an exemplary embodiment of the present inventive concept.

Referring to FIG. 24, a display apparatus 1000*b* receives input image data IDAT, boundary data BI and an input control signal ICONT from an external graphic processor 800. The graphic processor 800 in FIG. 24 may be substantially the same as the graphic processor 800 in FIG. 20.

The display apparatus 1000*b* includes a display panel 1100, a timing controller 1200*b*, a gate driver 1300 and a data driver 1400*b*. The display apparatus 1000*b* may further include a gamma compensator 1450.

The display apparatus 1000*b* of FIG. 24 may be substantially the same as the display apparatus 10*b* of FIG. 18, except that the boundary data BI is received from the external graphic processor 800. In addition, the timing controller 1200*b* in FIG. 24 is partially different from the timing controller 200*b* in FIG. 18. The display panel 1100, the gate driver 1300, the data driver 1400*b* and the gamma compensator 1450 in FIG. 24 may be substantially the same as the display panel 100, the gate driver 300, the data driver 400*b* and the gamma compensator 450 in FIG. 18, respectively.

The timing controller 1200*b* controls an operation of the display panel 1100 and controls operations of the gate driver 1300 and the data driver 1400*b*. The timing controller 1200*b* generates output image data DAT1 and DAT2, a first control signal CONT1 and a second control signal CONT2 based on the input image data IDAT, the boundary data BI and the input control signal ICONT.

Figure 25:
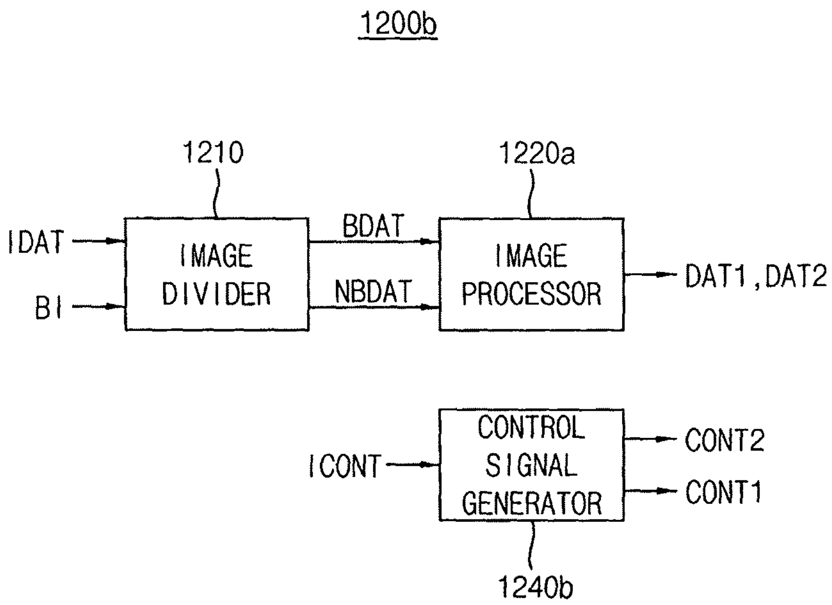
FIG. 25 is a block diagram illustrating a timing controller included in the display apparatus of FIG. 24 according to an exemplary embodiment of the present inventive concept.

FIG. 25 is a block diagram illustrating the timing controller 1200*b* included in the display apparatus 1000*b* according to an exemplary embodiment of the present inventive concept.

Referring to FIGS. 24 and 25, the timing controller 1200*b* generates first image data BDAT and second image data NBDAT based on the input image data IDAT and the boundary data BI and generates the output image data DAT1 and DAT2 based on the first and second image data BDAT and NBDAT. The display panel 1100 displays a first image (e.g., IMG1 in FIG. 3) based on the output image data DAT1 and DAT2. Boundary pixels (e.g., BP in FIG. 4) corresponding to a boundary region in the first image operate based on a reference gamma curve (e.g., GN in FIG. 5). Non-boundary pixels (e.g., NBP1 and NBP2 in FIG. 4) corresponding to a non-boundary region in the first image operate based on a first gamma curve (e.g., GH in FIG. 5) and a second gamma curve (e.g., GL in FIG. 5).

The timing controller 1200*b* may include an image divider 1210, an image processor 1220*a* and a control signal generator 1240*b*. The image divider 1210 in FIG. 25 may be substantially the same as the image divider 1210 in FIG. 21. The image processor 1220*a* and the control signal generator 1240*b* in FIG. 25 may be substantially the same as the image processor 220*a* and the control signal generator 240*b* in FIG. 19, respectively.

The display apparatus 10*a* of FIG. 16, the display apparatus 10*b* of FIG. 18, the display apparatus 1000 of FIG. 20, the display apparatus 1000*a* of FIG. 22 and the display apparatus 1000*b* of FIG. 24 may operate based on at least one of the examples of FIGS. 11A, 11B, 12A, 12B, 12C, 13A, 13B, 13C, 14A, 14B, 15A and 15B and may further operate based on the gradual gamma smoothing scheme described with reference to FIGS. 6, 7, 8 and 9.

The ESGM scheme, where the boundary region (e.g., the boundary pixels BP in FIG. 4) is driven by the normal driving scheme and the non-boundary region (e.g., the non-boundary pixels NBP1 and NBP2 in FIG. 4) is driven by the SGM scheme, may also be employed to the display apparatuses according to the exemplary embodiments of the present inventive concept. Accordingly, a resolution of the boundary region may not be degraded, and a display panel may have a relatively high transmittance, a relatively increased visibility and a relatively increased display quality.

Although the exemplary embodiments (e.g., the ESGM schemes) of the present inventive concept are described based on the examples of specific SGM schemes, specific gradual gamma smoothing schemes and specific pixel/panel structures, the exemplary embodiments may be employed in a display apparatus that operates based on at least one of various driving schemes and/or a display apparatus that has at least one of various pixel/panel structures.

The above described embodiments may be used in a display apparatus and/or a system including the display apparatus, such as a mobile phone, a smart phone, a personal digital assistant (PDA), a portable media player (PMP), a digital camera, a digital television, a set-top box, a music player, a portable game console, a navigation device, a personal computer (PC), a server computer, a workstation, a tablet computer, a laptop computer, a smart card, a printer, etc.

While the present inventive concept has been particularly shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A display apparatus, comprising:

a timing controller configured to generate first and second image data based on input image data and configured to generate output image data based on the first and second image data, the first image data corresponding to a boundary region in a first image, the second image data corresponding to a non-boundary region in the first image; and a display panel including a plurality of pixels, the display panel configured to display the first image based on the output image data, wherein the plurality of pixels include boundary pixels corresponding to the boundary region and non-boundary pixels corresponding to the non-boundary region, the boundary pixels operate based on a reference gamma curve, and the non-boundary pixels operate based on first and second gamma curves different from the reference gamma curve.

2. The display apparatus of claim 1, wherein a luminance of an image based on the first gamma curve is equal to or higher than a luminance of an image based on the reference gamma curve, and a luminance of an image based on the second gamma curve is equal to or lower than the luminance of the image based on the reference gamma curve.

3. The display apparatus of claim 1, wherein the non-boundary pixels include first nova-boundary pixels and second non-boundary pixels, a distance between the boundary region and each of the first non-boundary pixels is longer than a reference distance, and a distance between the boundary region and each of the second non-boundary pixels is equal to or shorter than the reference distance, wherein the first non-boundary pixels operate based on the first and second gamma curves, and the second non-boundary pixels operate based on third and fourth gamma curves different from the first and second gamma curves and the reference gamma curve.

4. The display apparatus of claim 3, wherein a luminance of an image based on the first gamma curve is equal to or higher than a luminance of an image based on the third gamma curve, the luminance of the image based on the third gamma curve is equal to or higher than a luminance of an image based on the reference gamma curve, a luminance of an image based on the fourth gamma curve is equal to or lower than the luminance of the image based on the reference gamma curve, and a luminance of an image based on the second gamma curve is equal to or lower than the luminance of the image based on the fourth gamma curve.

5. The display apparatus of claim 1, wherein the boundary region includes a plurality of dots, wherein a first dot among the plurality of dots includes: a first non-boundary pixel that operates based on the first gamma curve; and a second non-boundary pixel adjacent to the first non-boundary pixel, the second non-boundary pixel operates based on the second gamma curve.

6. The display apparatus of claim 5, wherein the first and second non-boundary pixels are disposed in a same row or a same column.

7. The display apparatus of claim 5, wherein the first dot further includes:

a third non-boundary pixel adjacent to one of the first and second non-boundary pixels, the third non-boundary pixel operates based on the second gamma curve.

8. The display apparatus of claim 7, wherein the third non-boundary pixel and at least one of the first and second non-boundary pixels are disposed in a same row or a same column.

9. The display apparatus of claim 7, wherein the first dot further includes:

a fourth non-boundary pixel adjacent to at least one of the first, second and third non-boundary pixels, the fourth non-boundary pixel operates based on the second gamma curve.

10. The display apparatus of claim 1, wherein the timing controller includes:

an image analyzer configured to extract high frequency components and low frequency components from the input image data, configured to determine that the high frequency components correspond to the boundary region, configured to determine that the low frequency components correspond to the non-boundary region, and configured to generate the first image data including the high frequency components and the second image data including the low frequency components; and an image processor configured to generate the output image data based on the first and second image data.

11. The display apparatus of claim 10, wherein the timing controller further includes:

a gamma storage storing reference gamma data associated with the reference gamma curve, first gamma data associated with the first gamma curve and second gamma data associated with the second gamma curve, wherein the image processor generates a first portion of the output image data for the boundary pixels based on the first image data and the reference gamma data, and generates a second portion of the output image data for the non-boundary pixels based on the second image data and the first and second gamma data.

12. The display apparatus of claim 10, further comprising:

a grayscale voltage generator configured to generate a first reference grayscale voltage corresponding to the reference gamma curve, a second reference grayscale voltage corresponding to the first gamma curve and a third reference grayscale voltage corresponding to the second gamma curve; and a data driver configured to generate first data voltages to be applied to the boundary pixels based on the first reference grayscale voltage and a first potion of the output image data, and configured to generate second data voltages to be applied to the non-boundary pixels based on the second and third reference grayscale voltages and a second portion of the output image data.

13. A display apparatus, comprising:

a timing controller configured to generate output image data based on input image data and boundary data provided from a graphic processor, the boundary data including information of a boundary region in a first image and information of a non-boundary region in the first image; and a display panel including a plurality of pixels, the display panel configured to display the first image based on the output image data, wherein the plurality of pixels include boundary pixels corresponding to the boundary region and non-boundary pixels corresponding to the non-boundary region, the boundary pixels operate based on a reference gamma curve, and the non-boundary pixels operate based on first and second gamma curves different from the reference gamma curve.

14. The display apparatus of claim 13, wherein a luminance of an image based on the first gamma curve is equal to or higher than a luminance of an image based on the reference gamma curve, and a luminance of an image based on the second gamma curve is equal to or lower than the luminance of the image based on the reference gamma curve.

15. The display apparatus of claim 13, wherein the non-boundary pixels include first non-boundary pixels and second non-boundary pixels, a distance between the boundary region and each of the first non-boundary pixels is longer than a reference distance, and a distance between the boundary region and each of the second non-boundary pixels is equal to or shorter than the reference distance, wherein the first non-boundary pixels operate based on the first and second gamma curves, and the second non-boundary pixels operate based on third and fourth gamma curves different from the first and second gamma curves and the reference gamma curve.

16. The display apparatus of claim 15, wherein a luminance of an image based on the first gamma curve is equal to or higher than a luminance of an image based on the third gamma curve, the luminance of the image based on the third gamma curve is equal to or higher than a luminance of an image based on the reference gamma curve, a luminance of an image based on the fourth gamma curve is equal to or lower than the luminance of the image based on the reference gamma curve, and a luminance of an image based on the second gamma curve is equal to or lower than the luminance of the image based on the fourth gamma curve.

17. The display apparatus of claim 13, wherein the boundary region includes a plurality of dots, wherein a first dot among the plurality of dots includes:

a first non-boundary pixel that operates based on the first gamma curve; and a second non-boundary pixel adjacent to the first non-boundary pixel, the second non-boundary pixel operates based on the second gamma curve.

18. The display apparatus of claim 17, wherein the first and second non-boundary pixels are disposed in a same row or a same column.

19. The display apparatus of claim 17, wherein the first dot further includes:

a third non-boundary pixel adjacent to one of the first and second non-boundary pixels, the third non-boundary pixel operates based on the second gamma curve.

20. The display apparatus of claim 19, wherein the third non-boundary pixel and at least one of the first and second non-boundary pixels are disposed in a same row or a same column.

21. The display apparatus of claim 19, wherein the first dot further includes:

a fourth non-boundary pixel adjacent to at least one of the first, second and third non-boundary pixels, the fourth non-boundary pixel operates based on the second gamma curve.

22. The display apparatus of claim 15, wherein the timing controller includes:

an image divider configured to divide the input image data into first image data corresponding to the boundary region and second image data corresponding to the non-boundary region based on the boundary data; and an image processor configured to generate the output image data based on the first and second image data.

23. The display apparatus of claim 22, wherein the timing controller further includes:

a gamma storage storing reference gamma data associated with the reference gamma curve, first gamma data associated with the first gamma curve and second gamma data associated with the second gamma curve, wherein the image processor generates a first portion of the output image data for the boundary pixels based on the first image data and the reference gamma data, and generates a second portion of the output image data for the non-boundary pixels based on the second image data and the first and second gamma data.

24. The display apparatus of claim 22, further comprising:

a grayscale voltage generator configured to generate a first reference grayscale voltage corresponding to the reference gamma curve, a second reference grayscale voltage corresponding to the first gamma curve and a third reference grayscale voltage corresponding to the second gamma curve; and a data driver configured to generate first data voltages to be applied to the boundary pixels based on the first reference grayscale voltage and a first portion of the output image data, and configured to generate second data voltages to be applied to the non-boundary pixels based on the second and third reference grayscale voltages and a second portion of the output image data.

25. A method of operating a display apparatus, the method comprising:

generating first and second image data based on input image data, the first image data corresponding to a boundary region in a first image, the second image data corresponding to a non-boundary region in the first image;

generating output image data based on the first and second image data; and displaying the first image on a display panel including a plurality of pixels based on the output image data, wherein the plurality of pixels include boundary pixels corresponding to the boundary region and non-boundary pixels corresponding to the non-boundary region, the boundary pixels operate based on a reference gamma curve, and the non-boundary pixels operate based on first and second gamma curves different from the reference gamma curve.

26. The method of claim 25, wherein a luminance of an image based on the first gamma curve is equal to or higher than a luminance of an image based on the reference gamma curve, and a luminance of an image based on the second gamma curve is equal to or lower than the luminance of the image based on the reference gamma curve.

27. The method of claim 25, wherein the non-boundary pixels include first non-boundary pixels and second non-boundary pixels, a distance between the boundary region and each of the first non-boundary pixels is longer than a reference distance, and a distance between the boundary region and each of the second non-boundary pixels is equal to or shorter than the reference distance, wherein the first non-boundary pixels operate based on the first and second gamma curves, and the second non-boundary pixels operate based on third and fourth gamma curves different from the first and second gamma curves and the reference gamma curve.

28. The method of claim 27, wherein a luminance of an image based on the first gamma curve is equal to or higher than a luminance of an image based on the third gamma curve, the luminance of the image based on the third gamma curve is equal to or higher than a luminance of an image based on the reference gamma curve, a luminance of an image based on the fourth gamma curve is equal to or lower than the luminance of the image based on the reference gamma curve, and a luminance of an image based on the second gamma curve is equal to or lower than the luminance of the image based on the fourth gamma curve.

29. The method of claim 25, wherein generating the first and second image data includes:

extracting high frequency components and low frequency components from the input image data;

determining that a region corresponding to the high frequency components is the boundary region;

determining that a region corresponding to the low frequency components is the non-boundary region; and generating the first image data including the high frequency components and the second image data including the low frequency components.

30. The method of claim 25, wherein generating the output image data includes:

generating a first portion of the output image data for the boundary pixels based on the first image data and reference gamma data associated with the reference gamma curve; and generating a second portion of the output image data for the non-boundary pixels based on the second image data, first gamma data associated with the first gamma curve and second gamma data associated with the second gamma curve.

31. The method of claim 25, wherein displaying the first image on the display panel includes:

generating first data voltages based on a first portion of the output image data and a first reference grayscale voltage corresponding to the reference gamma curve, and applying the first data voltages to the boundary pixels; and generating second data voltages based on a second portion of the output image data, a second reference grayscale voltage corresponding to the first gamma curve and a third reference grayscale voltage corresponding to the second gamma curve, and applying the second data voltages to the non-boundary pixels.

32. A method of operating a display apparatus, the method comprising:

generating output image data based on input image data and boundary data provided from a graphic processor, the boundary data including information of a boundary region in a first image and information of a non-boundary region in the first image; and displaying the first image on a display panel including a plurality of pixels based on the output image data, wherein the plurality of pixels include boundary pixels corresponding to the boundary region and non-boundary pixels corresponding to the non-boundary region, the boundary pixels operate based on a reference gamma curve, and the non-boundary pixels operate based on first and second gamma curves different from the reference gamma curve, wherein displaying the first image on the display panel includes:

generating first data voltages based on a first portion of the output image data and a first reference grayscale voltage corresponding to the reference gamma curve, and applying the first data voltages to the boundary pixels; and generating second data voltages based on a second portion of the output image data, a second reference grayscale voltage corresponding to the first gamma curve and a third reference grayscale voltage corresponding to the second gamma curve, and applying the second data voltages to the non-boundary pixels.

33. A display apparatus, comprising:

a timing control circuit that generates first image data and second image data in response to input image data and generates output image data in response to the first and second image data, the first image data corresponding to an edge between an object and a background in an image, the second image data corresponding to a surface of the object; and a display panel that displays the image in response to the output image data, the display panel including first pixels corresponding to the first image data and driven by a first driving scheme, and second pixels corresponding to the second image data and driven by a second driving scheme different from the first driving scheme, wherein in the second driving scheme, the second pixels are driven based on a plurality of different gamma curves, wherein the gamma curves used to drive the second pixels are determined according to a distance of the second pixels from the edge.

* * * * *